US011804517B2

(12) United States Patent  
Min et al.

(10) Patent No.: US 11,804,517 B2  
(45) Date of Patent: Oct. 31, 2023

(54) CAPACITOR OF SEMICONDUCTOR DEVICE AND DISTRIBUTED MODEL CIRCUIT FOR THE SAME

(71) Applicant: SK hynix Inc., Icheon-si (KR)

(72) Inventors: Ung Ki Min, Icheon-si (KR); Yong Je Jeon, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 238 days.

(21) Appl. No.: 17/001,681

(22) Filed: Aug. 25, 2020

(65) Prior Publication Data

US 2021/0376056 A1 Dec. 2, 2021

(30) Foreign Application Priority Data

May 26, 2020 (KR) .................. 10-2020-0062942

(51) Int. Cl.
```
G06F 30/367    (2020.01)
H01L 49/02     (2006.01)
G06F 30/3953   (2020.01)
H01L 23/528    (2006.01)
H01L 27/08     (2006.01)
H01L 21/66     (2006.01)
G06F 119/10    (2020.01)
```
(52) U.S. Cl.
CPC ............ *H01L 28/75* (2013.01); *G06F 30/367* (2020.01); *G06F 30/3953* (2020.01); *H01L 22/32* (2013.01); *H01L 23/528* (2013.01); *H01L 27/0805* (2013.01); *H01L 28/40* (2013.01); *H01L 28/60* (2013.01); *H01L 28/86* (2013.01); *G06F 2119/10* (2020.01)

(58) Field of Classification Search  
CPC ..... H01L 28/75; H01L 28/86; H01L 27/0805; H01L 22/32; H01L 28/60; H01L 23/528; H01L 28/40; G06F 30/367; G06F 30/3953; G06F 2119/10; G06F 30/398; G06F 30/36  
See application file for complete search history.

(56) References Cited

U.S. PATENT DOCUMENTS 6,763,503 B1 * 7/2004 Yang .................. G06F 30/367  
716/122  
6,870,436 B2   3/2005 Grebenkemper  
(Continued)

FOREIGN PATENT DOCUMENTS

WO    WO-2018216528 A1 * 11/2018 ............ H01G 4/30

*Primary Examiner* — Ahmed N Sefer

(57) ABSTRACT

A capacitor of a semiconductor device and a distributed model circuit for the same are disclosed. The capacitor includes a lower electrode layer, a plurality of upper electrode layers disposed over the lower electrode layer, a plurality of dielectric layers disposed between the lower electrode layer and each of the plurality of upper electrode layers, each dielectric layer configured to include a plurality of storage nodes, a plurality of line layers disposed over at least one of the plurality of upper electrode layers, and configured to receive a voltage for measuring an equivalent series resistance (ESR), and a plurality of contacts that electrically couple the plurality of line layers to the at least one of the plurality of upper electrode layers, wherein a resistance resulting from position information of the plurality of line layers and the plurality of contacts in a routing pattern corresponds to the ESR.

6 Claims, 19 Drawing Sheets

(56) References Cited

U.S. PATENT DOCUMENTS

| | | | |
|---|---|---|---|
| 2003/0072140 A1* | 4/2003 | Chung | H01L 23/50 |
| | | | 257/E23.079 |
| 2006/0018082 A1* | 1/2006 | Yamagata | H01G 5/38 |
| | | | 361/321.2 |
| 2015/0076924 A1 | 3/2015 | Kim et al. | |
| 2016/0049393 A1* | 2/2016 | Jing | H01L 28/60 |
| | | | 257/532 |
| 2016/0183386 A1* | 6/2016 | Song | H05K 3/4644 |
| | | | 29/25.41 |
| 2017/0338038 A1* | 11/2017 | Nakaiso | H01G 4/33 |
| 2017/0345577 A1* | 11/2017 | Nakaiso | H01G 4/008 |
| 2020/0273625 A1* | 8/2020 | Mizuno | H01G 4/38 |

* cited by examiner

CAPACITOR OF SEMICONDUCTOR DEVICE AND DISTRIBUTED MODEL CIRCUIT FOR THE SAME

CROSS-REFERENCE TO RELATED APPLICATION

This patent document claims priority to and the benefits of Korean patent application No. 10-2020-0062942 filed on May 26, 2020, which is incorporated by reference in its entirety as part of the disclosure of this patent document.

TECHNICAL FIELD

The technology and implementations disclosed herein generally relate to a capacitor of a semiconductor device and a distributed model circuit for the same, and more particularly to technology for a semiconductor device including a capacitor for noise reduction.

BACKGROUND

Important variables capable of greatly affecting performance or throughput of semiconductor devices include a higher degree of integration, a lower operation voltage, and a higher operation speed. In recent times, as the number of semiconductor devices designed to operate at a lower voltage is rapidly increasing, various power-supply voltages are also needed for such semiconductor devices. However, when the semiconductor device is powered on by receiving the power-supply voltage, noise may unavoidably occur in the semiconductor device, and such noise may change signal transmission (Tx) characteristics (i.e., a delay value) of the semiconductor device. Recently, one or more high-volume capacitors (i.e., large-capacity capacitors) for noise cancellation have been formed in a peripheral circuit region of a semiconductor device.

SUMMARY

Various embodiments of the disclosed technology relate to a capacitor of a semiconductor device and a distributed model circuit for the same, which can reflect a resistance change caused by a routing pattern of the capacitor in Equivalent Series Resistance (ESR).

In accordance with an embodiment of the disclosed technology, a capacitor of a semiconductor device may include a lower electrode layer, a plurality of upper electrode layers disposed over the lower electrode layer in a third direction, a plurality of dielectric layers disposed between the lower electrode layer and each of the plurality of upper electrode layers, each dielectric layer configured to include a plurality of storage nodes, a plurality of line layers disposed over at least one of the plurality of upper electrode layers, and configured to receive a voltage for measuring an equivalent series resistance (ESR), and a plurality of contacts that electrically couple the plurality of line layers to the at least one of the plurality of upper electrode layers, wherein a resistance resulting from position information of the plurality of line layers and the plurality of contacts in a routing pattern corresponds to the equivalent series resistance (ESR).

In accordance with another embodiment of the disclosed technology, a distributed model circuit of a capacitor may include a lower electrode layer modeled as a plurality of first resistors corresponding to a first parasitic capacitance, a dielectric layer vertically stacked on the lower electrode layer, and configured to include a plurality of storage nodes, and an upper electrode layer modeled as a plurality of second resistors corresponding to a second parasitic capacitance, and configured to receive a current for measuring an equivalent series resistance (ESR) through respective nodes by which the plurality of second resistors are coupled to each other, wherein the lower electrode layer, the dielectric layer, and the upper electrode layer are vertically stacked to form a three-dimensional (3D) structure.

It is to be understood that both the foregoing general description, and the following detailed description, of the technology disclosed herein are illustrative and explanatory and intended to provide further explanation of the scope of the disclosure to those skilled in the art.

BRIEF DESCRIPTION OF THE DRAWINGS

The above and other features and beneficial aspects of the disclosed technology will become readily apparent with reference to the following detailed description when considered in conjunction with the accompanying drawings.

DETAILED DESCRIPTION

Figure 1:
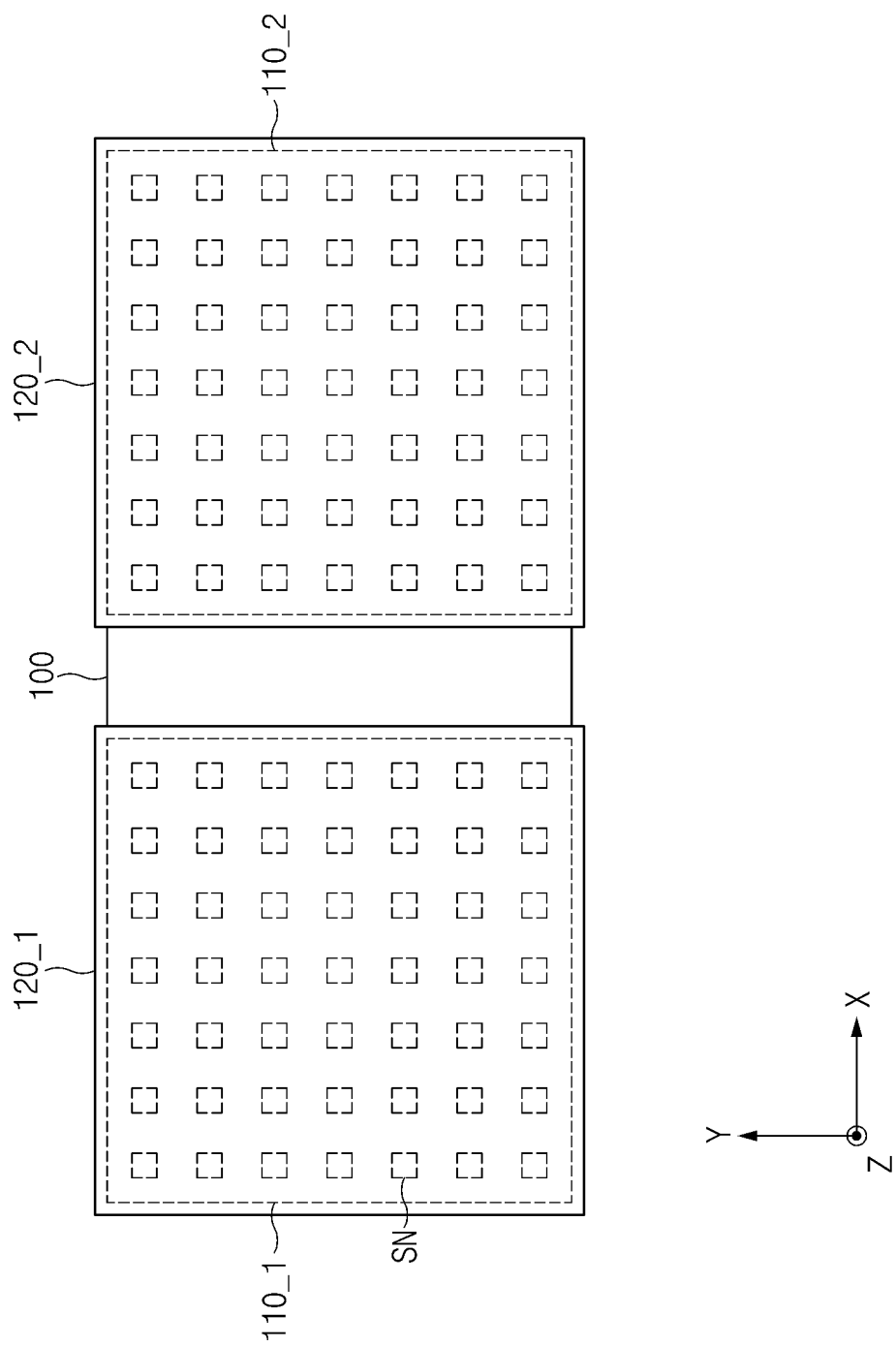
FIG. 1 is a schematic plan view illustrating an example of a capacitor of a semiconductor device based on some implementations of the disclosed technology.

This patent document provides implementations and examples of a capacitor of a semiconductor device and a distributed model circuit for the same that substantially address one or more issues related to limitations or disadvantages of the related art. Some implementations of the disclosed technology suggest a capacitor of a semiconductor device and a distributed model circuit for the same, which can reflect a resistance change caused by a routing pattern of the capacitor in Equivalent Series Resistance (ESR).

Reference will now be made in detail to embodiments of the disclosed technology, examples of which are illustrated in the accompanying drawings. Wherever possible, the same reference numbers are used throughout the drawings to refer to the same or like portions.

Advantages and features of the disclosed technology and methods of achieving the advantages and features of the disclosed technology will be clearly understood from embodiments described hereinafter in conjunction with the accompanying drawings. However, the disclosed technology is not limited to the following embodiments and may be realized in various different forms. These embodiments are provided only to completely disclose the disclosed technology and for a person having ordinary skill in the art to which the disclosed technology pertains to completely understand the category of the disclosure. In the drawings, the sizes or relative sizes of layers and regions may be exaggerated for clarity of description.

Two directions which are arranged perpendicular to each other to form a plane will hereinafter be respectively defined as an X-axis direction and a Y-axis direction, and a vertical direction perpendicular to the plane will hereinafter be defined as a Z-axis direction. The X-axis direction, the Y-axis direction and the Z-axis direction may be arranged perpendicular to each other and may form an orthogonal axis. In the following description, the term "vertical" or "vertical direction" may be substantially identical to the Z-axis direction. In the drawings, the direction denoted by arrows and the other direction opposite to the arrow direction will hereinafter be substantially identical to each other.

Figure 2:
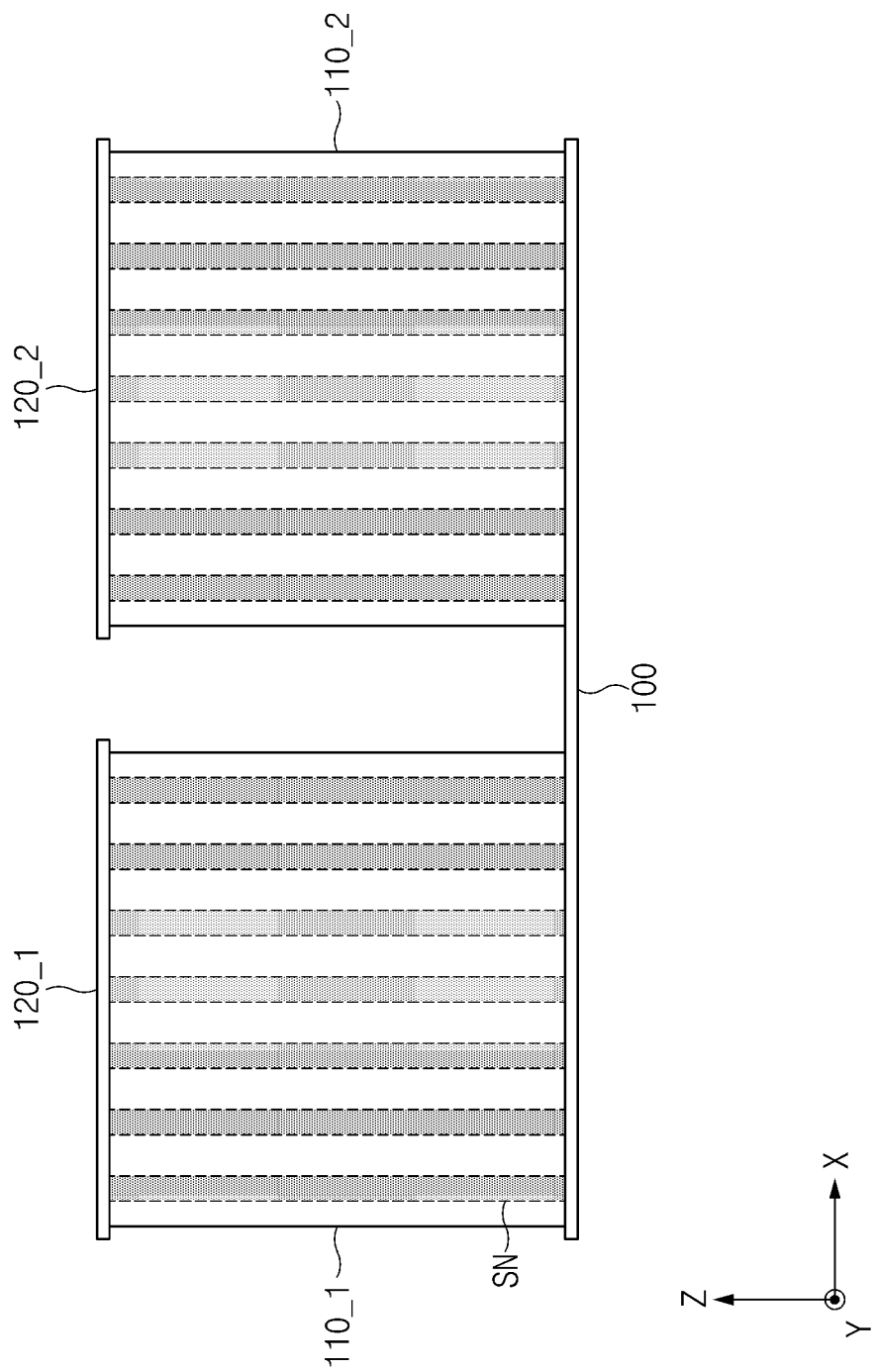
FIG. 2 is a schematic cross-sectional view illustrating an example of the capacitor of the semiconductor device shown in FIG. 1 based on some implementations of the disclosed technology.
Figure 3:
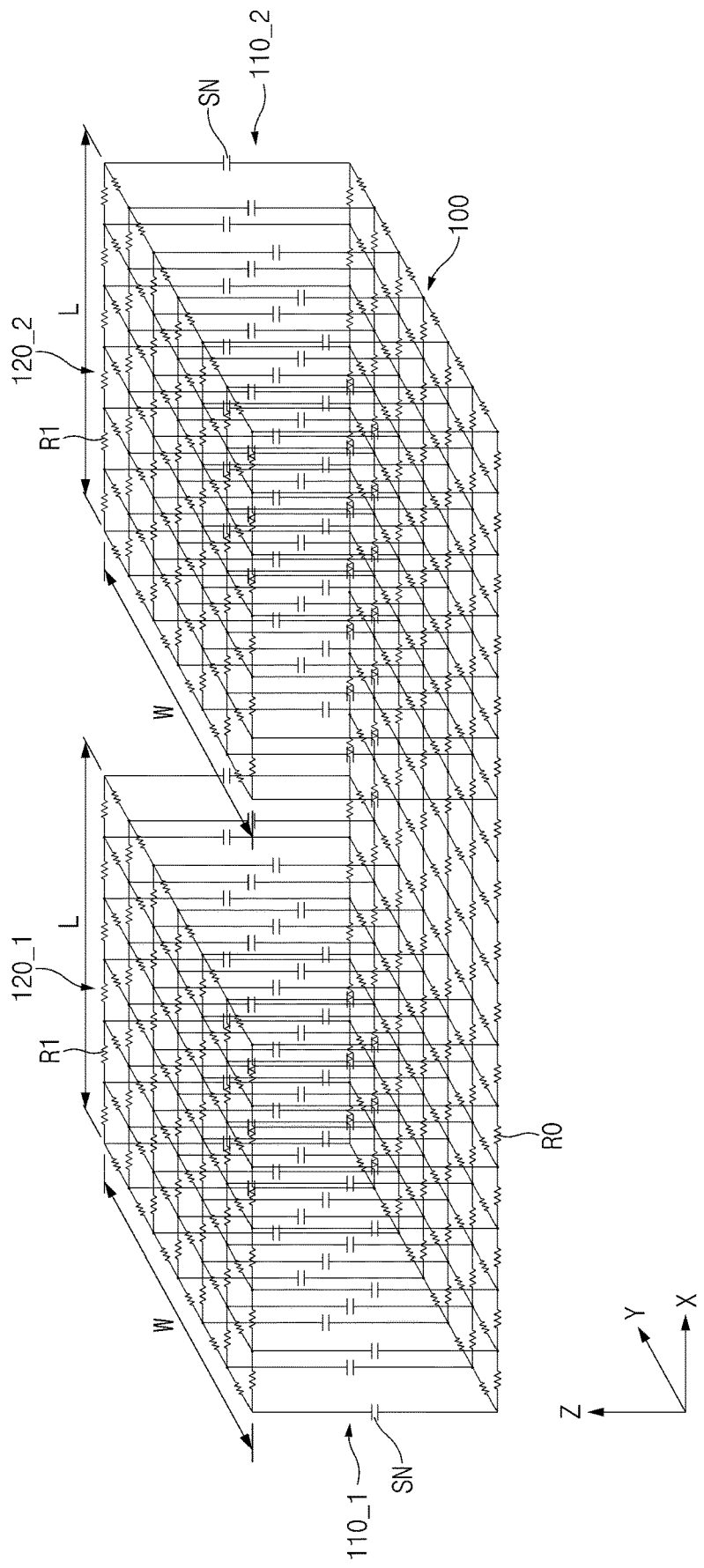
FIG. 3 is a schematic diagram illustrating an example of a distributed model circuit of the capacitor shown in FIG. 1.

FIG. 1 is a schematic plan view illustrating an example of a capacitor of a semiconductor device according to an embodiment of the present disclosure. FIG. 2 is a schematic cross-sectional view illustrating an example of the capacitor of the semiconductor device shown in FIG. 1 based on some implementations of the disclosed technology. FIG. 3 is a schematic diagram illustrating an example of a distributed model circuit of the capacitor shown in FIG. 1.

Referring to FIGS. 1 to 3, a capacitor may include a lower electrode layer 100, dielectric layers 110_1 and 110_2, and upper electrode layers 120_1 and 120_2. The capacitor may be a large-capacity capacitor having high capacitance (e.g., in units of microfarad µF). In addition, the capacitor may be a Metal-Insulator-Metal (MIM) capacitor in which an insulation layer is formed between two electrodes.

The lower electrode layer 100 may be used as a lower electrode of the capacitor, and may include a metal electrode. Each of the upper electrode layers 120_1 and 120_2 may be used as an upper (plate) electrode of the capacitor, and may include a metal electrode. In some implementations, the metal electrode may include metal, polysilicon, tungsten, or a combination thereof.

In addition, the dielectric layer 110_1 may be disposed between the lower electrode 100 and the upper electrode layer 120_1, and the dielectric layer 110_2 may be disposed between the lower electrode 100 and the upper electrode layer 120_2. The dielectric layer 110_1 (e.g., a dielectric layer of a first group) and the dielectric layer 110_2 (e.g., a dielectric layer of a second group) may be spaced apart in an X-axis direction common to the lower electrode layer 100. The dielectric layer 110_1 may be formed to correspond to the upper electrode layer 120_1. The dielectric layer 110_2 may be formed to correspond to the upper electrode layer 120_2. The dielectric layer 110_1 and the dielectric layer 110_2 may share the lower electrode layer 100.

In the cross-sectional view shown in FIG. 2, each of the dielectric layers 110_1 and 110_2 may include a plurality of storage nodes (SN). The storage nodes SN of each of the dielectric layers 110_1 and 110_2, respectively, may be spaced apart from each other by a predetermined distance, or at a predetermined pitch, in an X-axis direction and a Y-axis direction. The plurality of storage nodes (SN) may be formed in a line shape extending in a Z-axis direction. The plurality of storage nodes (SN) may be coupled to each other in a vertical direction (i.e., Z-axis direction) while being disposed between the lower electrode layer 100 and corresponding upper electrode layer 120_1 or upper electrode layer 120_2.

Each of the dielectric layers 110_1 and 110_2 may include a high-permittivity (i.e., high-K) material. The high-K material may include a material that has a higher dielectric constant than a silicon oxide material. The high-K material may include at least one metallic element. The high-K material may include a hafnium-containing material. As examples, the hafnium-containing material may include hafnium oxide ($HfO_2$), hafnium silicon oxide (HfSiO), hafnium silicon oxynitride, or a combination thereof. In some other implementations, the high-K material may include, for example, lanthanum oxide ($La_2O_3$), lanthanum aluminum oxide ($LaAlO_3$), zirconium oxide ($ZrO_2$), zirconium silicon oxide (ZrSiO), zirconium silicon oxynitride (ZrSiON), aluminum oxide ($Al_2O_3$), and a combination thereof. If necessary, the high-K material may also be selectively implemented by any of other high-K materials well known to those skilled in the art.

Referring to FIG. 3, the distributed model circuit of the capacitor may include the lower electrode layer 100, the dielectric layers 110_1 and 110_2, and the upper electrode layers 120_1 and 120_2. The lower electrode layer 100 may be modeled as resistors (R0) corresponding to parasitic resistance. Each of the upper electrode layers 120_1 and 120_2 may be modeled as resistors (R1) corresponding to parasitic resistance. Each of the dielectric layers 110_1 and 110_2 may be modeled as storage nodes (SN) corresponding to capacitance.

In some embodiments of the disclosed technology, a resistor-capacitor (RC) network including resistors (R0), resistors (R1), and capacitance can be implemented as a distributed model. The distributed model circuit of the capacitor may be implemented as a three-dimensional (3D) structure with the lower electrode layer 100, the dielectric layers 110_1 and 110_2 stacked on the lower electrode layer 100, and the upper electrode layers 120_1 and 120_2 stacked respectively on the dielectric layers 110_1 and 110_2 in a Z-axis direction.

Lines (or wires) of the lower electrode layer 100 may be spaced apart from each other by a predetermined distance or pitch in the X-axis direction and the Y-axis direction. Parasitic resistance that can be generated by lines coupled to the storage nodes (SN) of the dielectric layers 110_1 and 110_2 can be modeled as a plurality of resistors (R0) in the lower electrode layer 100.

Each of the dielectric layers 110_1 and 110_2 may include a plurality of storage nodes (SN) spaced apart from each other by a predetermined distance or pitch in the X-axis direction and the Y-axis direction. That is, in FIG. 3, the dielectric layers 110_1 and 110_2 can be modeled as storage nodes (SN) corresponding to the capacitor.

Lines of the upper electrode layer 120_1 and lines of the upper electrode layer 120_2 may be respectively spaced apart from each other by a predetermined distance or pitch in the X-axis direction and the Y-axis direction, and may be arranged in a matrix shape. Parasitic resistance that may be generated by lines coupled to the storage nodes (SN) of the dielectric layer 110_1 can be modeled as the plurality of resistors (R1) in the upper electrode layer 120_1, and parasitic resistance that may be generated by lines coupled to the storage nodes (SN) of the dielectric layer 110_2 can be modeled as the plurality of resistors (R1) in the upper electrode layer 120_2.

For example, an X-directional length (L) in the distributed model circuit of the capacitor may refer to a plate length of the upper electrode layer 120_1. A Y-directional width (W) in the distributed model circuit of the capacitor may refer to a plate width of the upper electrode layer 120_1.

In addition, the X-directional length (L) in the distributed model circuit of the capacitor may refer to a plate length of the upper electrode layer 120_2. The Y-directional width (W) in the distributed model circuit of the capacitor may refer to a plate width of the upper electrode layer 120_2.

In FIGS. 4A to 11B, the same constituent elements as those described with reference to FIGS. 1 to 3 will hereinafter be referred to with the same reference numerals as those of FIGS. 1 to 3, and as such redundant description thereof will herein be omitted for brevity. For convenience of description and better understanding of the disclosed technology, it should be noted that only essential constituent elements requisite for description of the disclosed technology are illustrated in planar arrangement structures shown in FIGS. 4A, 5A, 6A, 7A, 8A, 9A, 10A, and 11A. Accordingly, the essential constituent elements will hereinafter be described with reference to FIGS. 4A, 5A, 6A, 7A, 8A, 9A, 10A, and 11A.

Figure 4A:
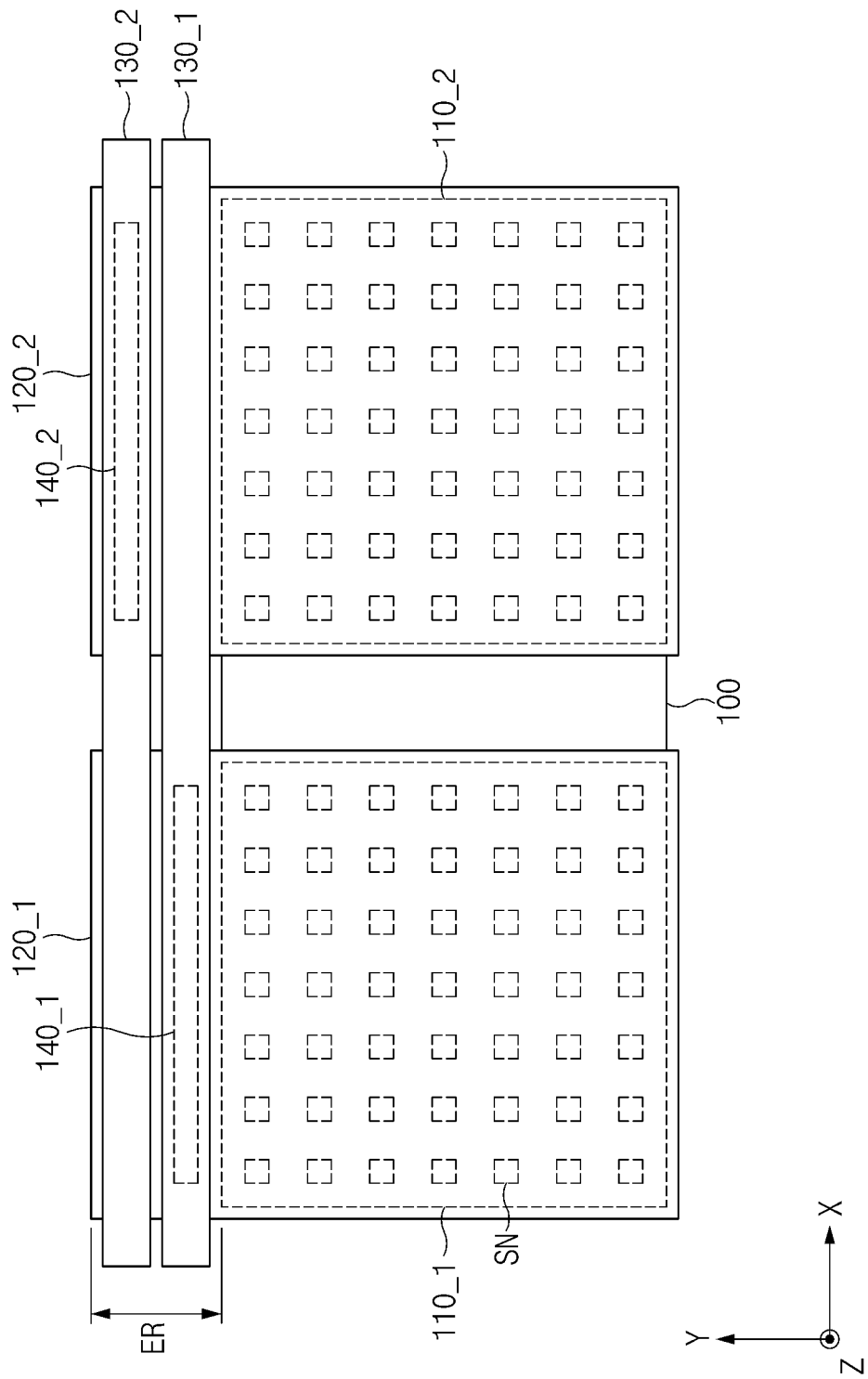
FIGS. 4A to 11B are schematic plan views illustrating a capacitor and a distributed model circuit corresponding to the capacitor in accordance with embodiments of the disclosure.
Figure 4B:
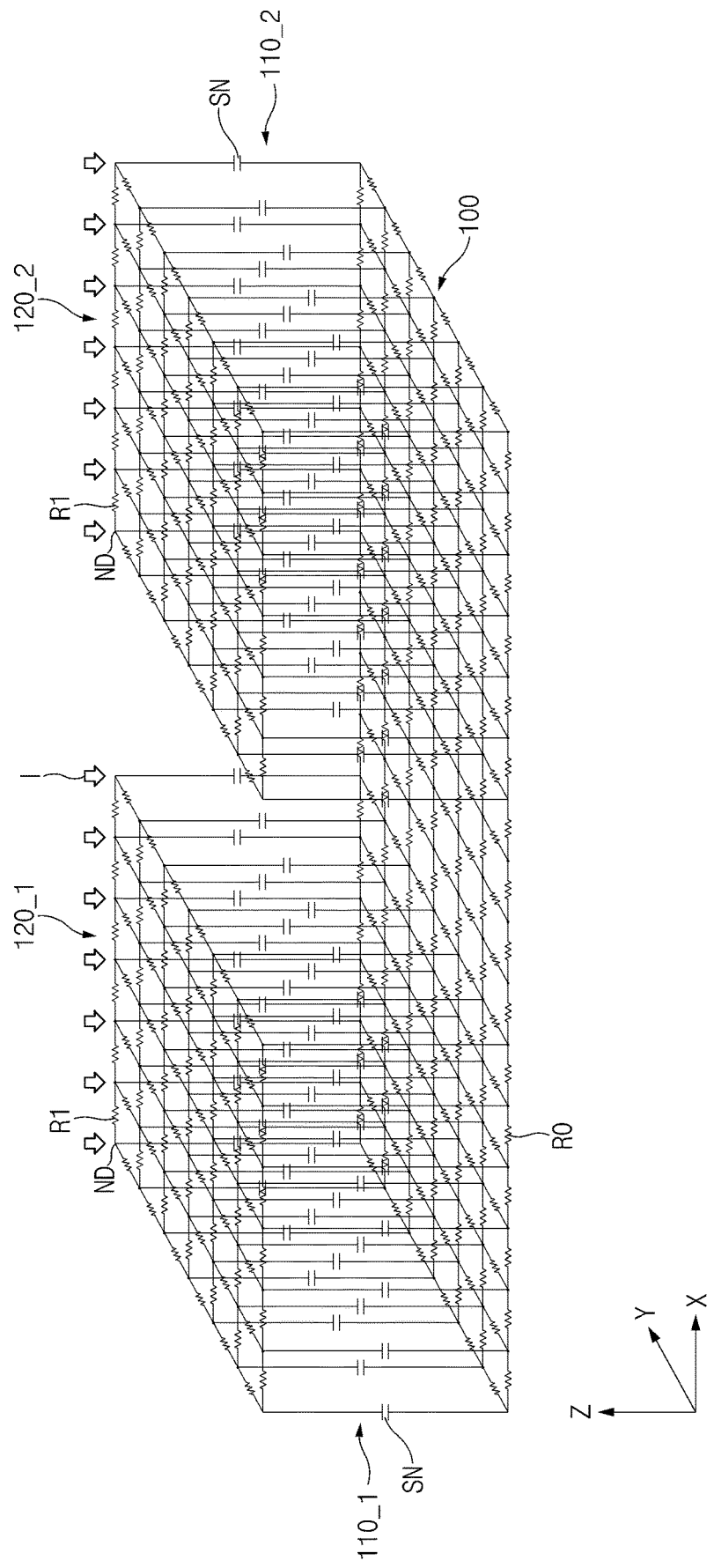

FIG. 4A is a schematic plan view illustrating a capacitor, and FIG. 4B is a schematic diagram illustrating a distributed model circuit corresponding to the capacitor, according to an embodiment of the disclosure.

Referring to FIGS. 4A and 4B, each of the upper electrode layers 120_1 and 120_2 may include an extension region (ER) that is formed to extend in the Y-axis direction. In this case, the extension region (ER) may be a region that does not overlap with the lower electrode layer 100 in the Z-axis direction (i.e., does not overlap in a plan view). In some other implementations, the extension region ER may overlap, partly or entirely, with the lower electrode layer 100 in the Z-axis direction.

A line layer 130_1 may be formed over the extension region (ER) of the upper electrode layer 120_1, and a line layer 130_2 may be formed over the extension region (ER) of the upper electrode layer 120_2. That is, each of the line layers 130_1 and 130_2 may be formed in an edge region, which is extended in the Y-axis direction.

Some parts or portions of the line layers 130_1 and 130_2 may overlap with the extension region (ER) of the upper electrode layers 120_1 and 120_2 in the Z-axis direction. Each of the line layers 130_1 and 130_2 may be formed in a line shape extending in the X-axis direction. The line layers 130_1 and 130_2 may be formed to traverse the extension region (ER) of both the upper electrode layers 120_1 and 120_2 in the X-axis direction.

The line layer 130_1 and the line layer 130_2 may be spaced apart from each other by a predetermined distance in the Y-axis direction. The line layer 130_1 and the line layer 130_2 may extend in parallel to each other in the X-axis direction.

In an embodiment, the line layer 130_1 may be a line for providing a power-supply voltage. In other embodiments, the line layer 130_1 may be a line for providing a ground voltage. The voltage provided through the line layer 130_1 may be transferred to the lower electrode layer 100 through a contact 140_1, the upper electrode layer 120_1 (for example, the upper electrode layer of the first group) and the storage nodes (SN).

In addition, in an embodiment, the line layer 130_2 may be a line for providing the ground voltage. In other embodiments, the line layer 130_2 may be a line for providing the power-supply voltage. The voltage provided through the line layer 130_2 may be transferred to the lower electrode layer 100 through a contact 140_2, the upper electrode layer 120_2 (for example, the upper electrode layer of the second group), and the storage nodes (SN).

The contact 140_1 (for example, a "via") may be formed between the extension region (ER) of the upper electrode layer 120_1 and the line layer 130_1. Similarly, and the contact 140_2 (for example, also a "via") may be formed between the extension region (ER) of the upper electrode layer 120_2 and the line layer 130_2. In other words, the contact 140_1 may be a via formed between the upper electrode layer 120_1 and the line layer 130_1, and the contact 140_2 may be a via formed between the upper electrode layer 120_2 and the line layer 130_2. The contact 140_1 may electrically interconnect the upper electrode layer 120_1 and the line layer 130_1. The contact 140_2 may electrically interconnect the upper electrode layer 120_2 and the line layer 130_2.

The capacitor shown in FIG. 4A may be represented by the distributed model circuit shown in FIG. 4B. The distributed model circuit of the capacitor may apply a current (I) to at least one of the plurality of nodes (ND) of each of the upper electrode layers 120_1 and 120_2 so as to measure Equivalent Series Resistance (ESR). That is, as illustrated in FIG. 4B, the node (ND) designed to receive the current (I) may be constructed in the same metal routing pattern as in an actual capacitor. For example, the node (ND) receiving the current (I) may be disposed in one edge region of a storage node (SN) matrix of each of the upper electrode layers 120_1 and 120_2 in the Y-axis direction.

In the distributed model of the capacitor, the node (ND) of the upper electrode layer 120_1 may correspond to a position in a pattern in which the contact 140_1 is routed to the capacitor, and the node (ND) of the upper electrode layer 120_2 may correspond to a position in a pattern in which the contact 140_2 is routed to the capacitor. In FIG. 4, the position of the contact 140_1 routed to the upper electrode layer 120_1 may correspond to the node (ND) receiving the current (I), and the position of the contact 140_2 routed to the upper electrode layer 120_2 may correspond to the node (ND) receiving the current (I). Therefore, the unit current (I) may be applied to each of the nodes (ND) arranged in the X-axis direction through the line layers 130_1 and 130_2.

The current (I) applied to each of the nodes (ND) of the upper electrode layers 120_1 and 120_2 may flow through the resistors (R1), the storage nodes (SN), and the resistors (R0). Since the ESR value changes according to the size of each of the upper electrode layers 120_1 and 120_2, an ESR relationship equation based on the sizes of the upper electrode layers 120_1 and 120_2 can be utilized. The ESR relationship equation may be used as the ESR equation calculated using a resistance distribution model. In the ESR equation, resistance caused by the metal routing pattern (e.g., resistance caused by the line layers 130_1 and 130_2 and the contacts 140_1 and 140_2), the value of resistors (R1), capacitance of the storage nodes (SN), and the value of resistors (R0) can be mathematically reflected.

As a result, a netlist (NETLIST) may be created through the distributed model, such that equivalent resistance corresponding to an ESR can be calculated by simulation. The resistance value mathematically calculated by simulation may be used as the ESR of the capacitor, which includes the corresponding routing pattern.

For example, the resistance value can be calculated by the relationship equation "R(Resistance)=V(Voltage)/I(Current)". For convenience of description and better understanding of the disclosed technology, it is assumed that the current (I) used in the distributed model of the capacitor may be fixed at a constant value. Thereafter, when the voltage is applied to the distributed model circuit of the capacitor through the line layers 130_1 and 130_2 and the contacts 140_1 and 140_2, the equivalent series resistance (ESR) value can be mathematically calculated. In the following embodiments, when the metal routing pattern (i.e., the positions of the line layers 130_1 and 130_2 and the positions of the contacts 140_1 and 140_2) is changed, resistance changes due to the revised metal routing pattern may be reflected in the changed metal routing pattern, such that the ESR value can be obtained.

As described above, the above-mentioned embodiment can implement the ESR relationship equation by simulating equivalent resistance using the 3D distributed model. Subsequently, the sizes of the upper electrode layers 120_1 and 120_2 (i.e., the plate length (L) and the plate width (W)) can be used as variables in the ESR relationship equation. Accordingly, when the sizes of the upper electrode layers 120_1 and 120_2 are changed, the ESR value of the capacitor can be mathematically calculated by applying a variable to the ESR relationship equation.

In the design of a semiconductor device, the capacitor may be used to remove noise of an on-chip structure. Specifically, the capacitor may be designed in a manner such that a portion for providing a power-supply voltage to the semiconductor device is not affected by noise according to inner and outer conditions of the chip. However, the capacitor for reducing parasitic resistance may incur other parasitic resistance corresponding to Equivalent Series Resistance (ESR).

Specifically, from among layers used to construct the capacitor, each of the upper electrode layers 120_1 and 120_2 may have high sheet resistance. Thus, a change in resistances R0 and R1 may greatly increase, depending on not only the routing pattern of the line layers 130_1 and 130_2 stacked on the upper electrode layer 120_1, but also on the contacts 140_1 and 140_2 through which the line layers 130_1 and 130_2 can be coupled to each other. Therefore, the change in resistances R0 and R1 based on the routing pattern may affect the magnitude of the ESR of the capacitor. Therefore, an embodiment of the disclosed technology may implement a 3D distributed model that takes into consideration the routing pattern of component layers, such that change in resistances R0 and R1 based on the routing pattern can be reflected in the ESR magnitude.

Figure 5A:
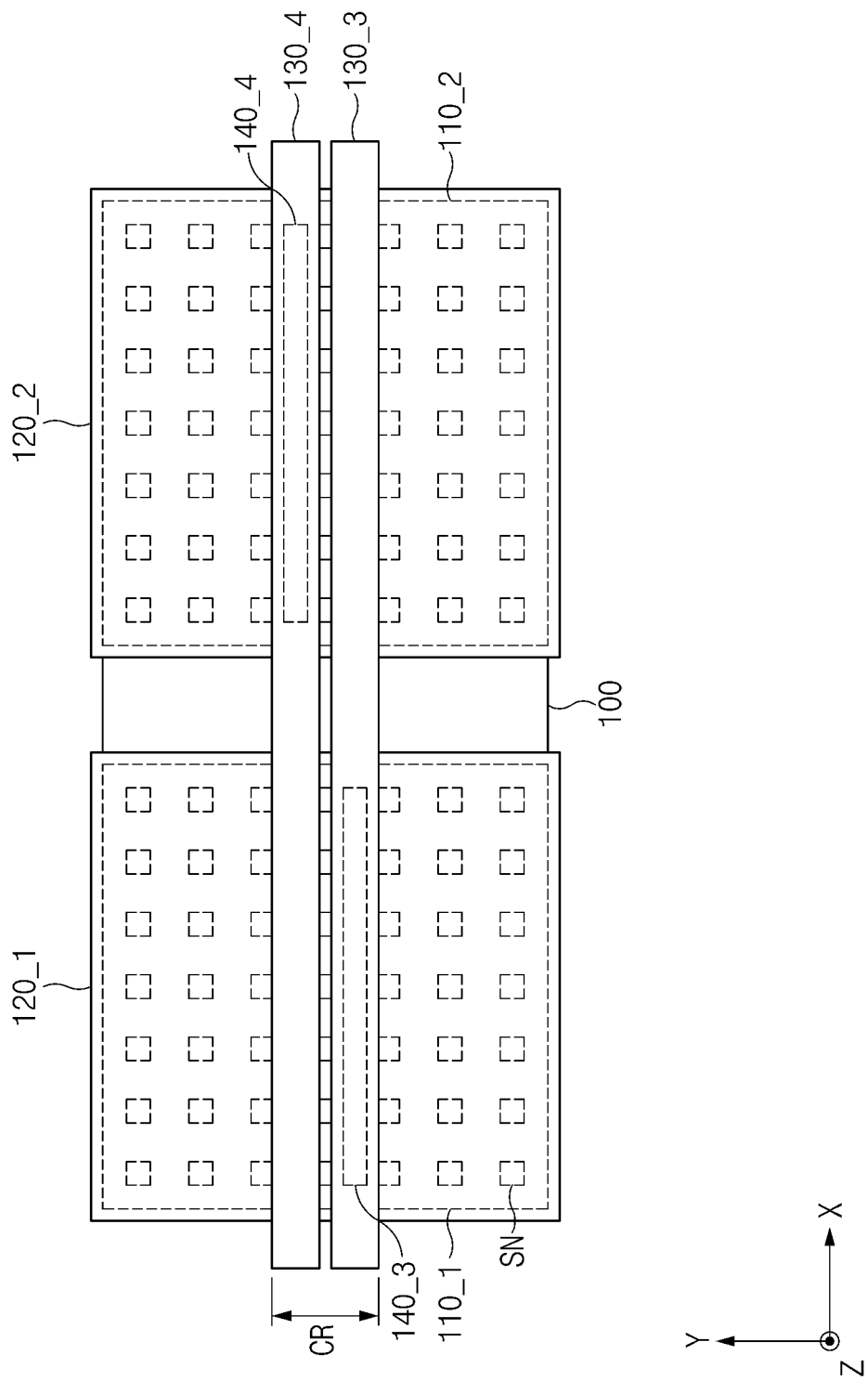
Figure 5B:
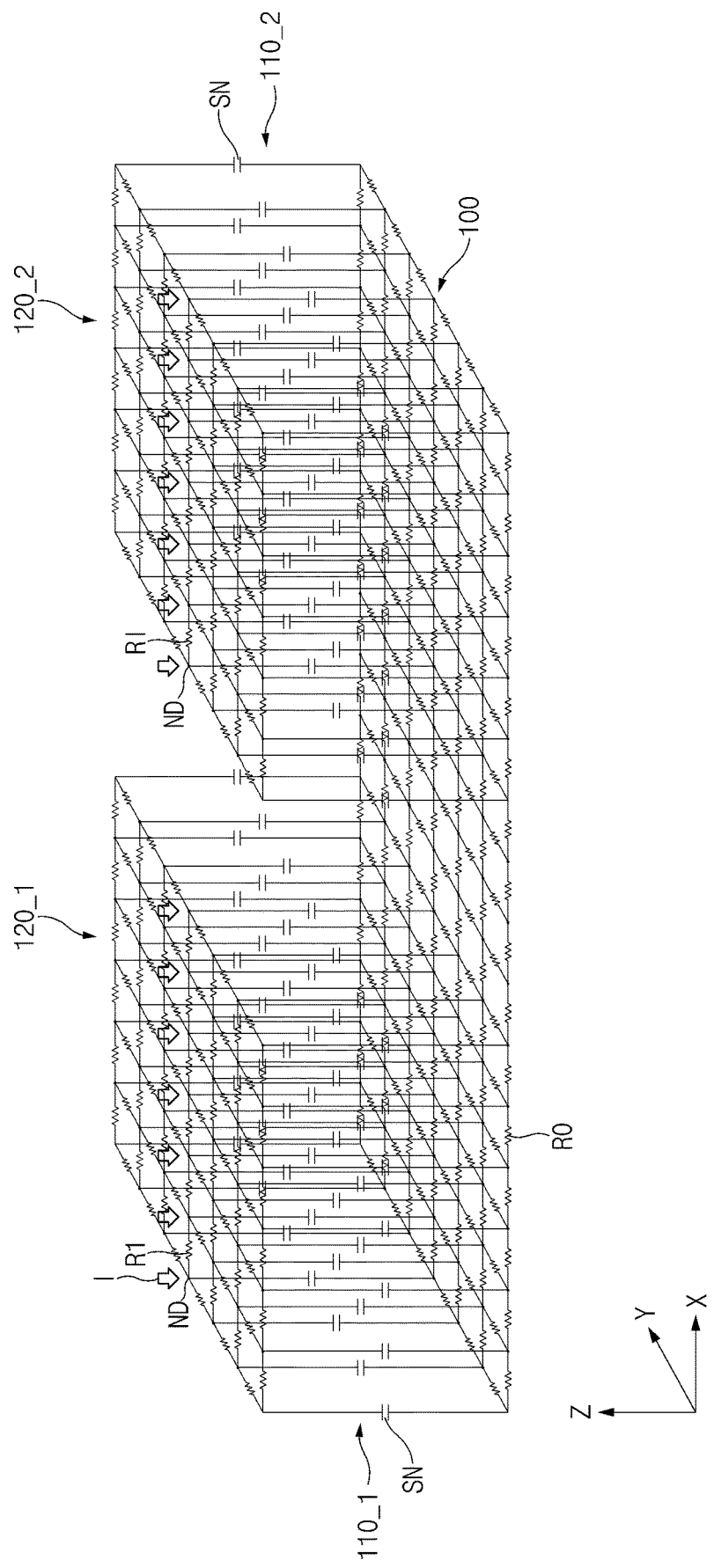

FIG. 5A is a schematic plan view illustrating a capacitor, and FIG. 5B is a schematic diagram illustrating a distributed model circuit corresponding to the capacitor, according to an embodiment of the disclosure.

Referring to FIGS. 5A and 5B, line layers 130_3 and 130_4 may be formed in a center region (CR) of the upper electrode layers 120_1 and 120_2 with respect to the Y-axis direction. That is, some parts or portions of the line layers 130_3 and 130_4 may overlap with the center region (CR) of both of the upper electrode layers 120_1 and 120_2 in the Z-axis direction. Each of the line layers 130_3 and 130_4 may be formed in a line shape extending in the X-axis direction. The line layers 130_3 and 130_4 may be formed to traverse the center region (CR) in the X-axis direction.

The line layer 130_3 and the line layer 130_4 may be spaced apart from each other by a predetermined distance in the Y-axis direction. The line layer 130_3 and the line layer 130_4 may extend in parallel to each other in the X-axis direction.

In an embodiment, the line layer 130_3 may be a line for providing a power-supply voltage. In other embodiments, the line layer 130_3 may be a line for providing a ground voltage. The voltage provided through the line layer 130_3 may be transferred to the lower electrode layer 100 through a contact 140_3, the upper electrode layer 120_1, and the storage nodes (SN).

In addition, in an embodiment, the line layer 130_4 may be a line for providing the ground voltage. In other embodiments, the line layer 130_4 may be a line for providing the power-supply voltage. The voltage provided through the line layer 130_4 may be transferred to the lower electrode layer 100 through a contact 140_4, the upper electrode layer 120_2, and the storage nodes (SN).

The contact 140_3 (for example, a "via") may be formed between the center region (CR) of the upper electrode layer 120_1 and the line layer 130_3, and the contact 140_4 (for example, a "via") may be formed between the center region (CR) of the upper electrode layer 120_2 and the line layer 130_4. In other words, the contact 140_3 may be a via formed between the upper electrode layer 120_1 and the line layer 130_3, and the contact 140_4 may be a via formed between the upper electrode layer 120_2 and the line layer 130_4. The contact 140_3 may electrically interconnect the upper electrode layer 120_1 and the line layer 130_3. The contact 140_4 may electrically interconnect the upper electrode layer 120_2 and the line layer 130_4.

The capacitor shown in FIG. 5A may be represented by the distributed model circuit shown in FIG. 5B. In an embodiment illustrated by FIG. 5B, the nodes (ND) receiving the current (I) may be disposed in the center region (CR) of the upper electrode layers 120_1 and 120_2 with respect to the Y-axis direction, and may be arranged in a single line or row in the X-axis direction.

Figure 6A:
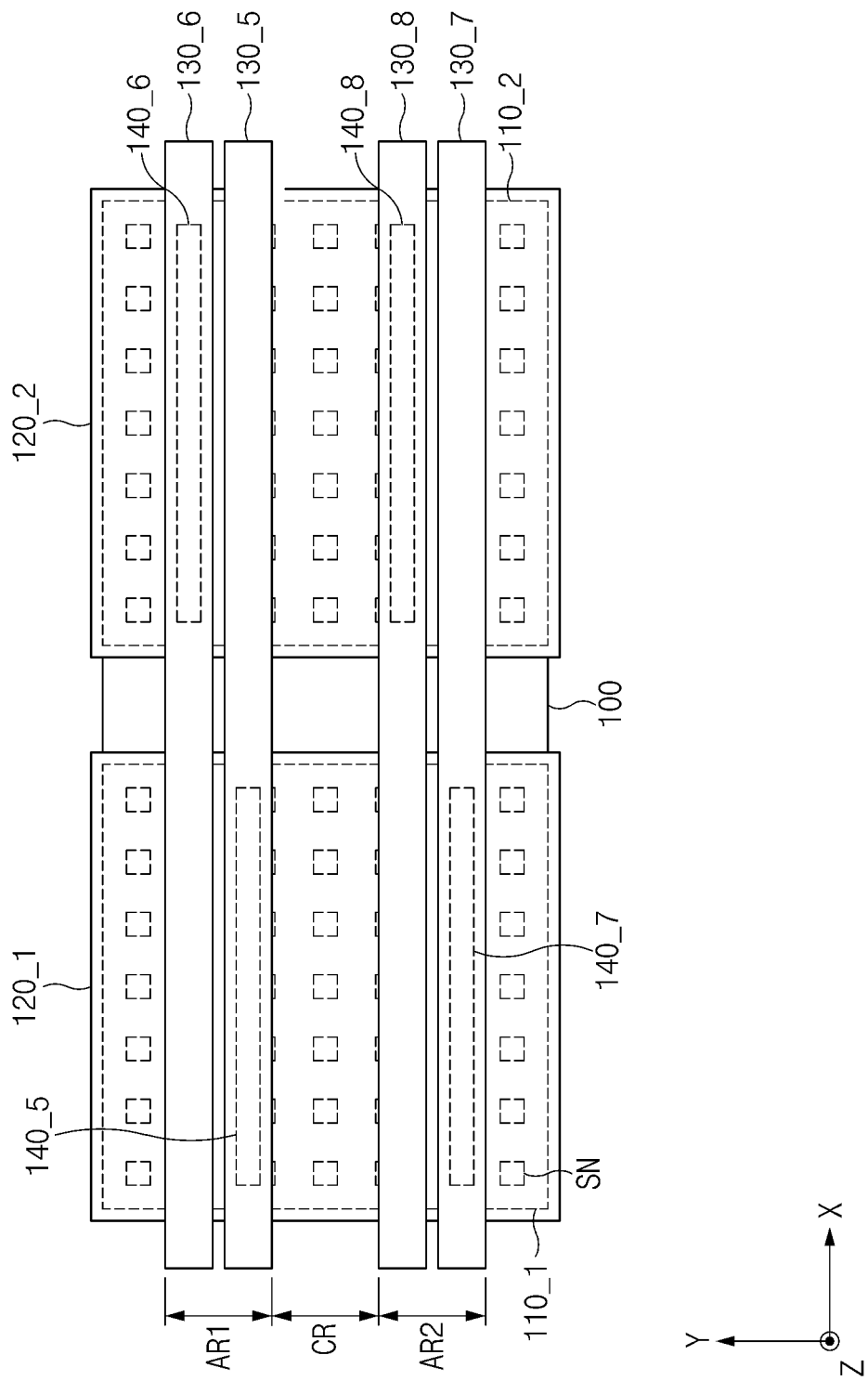
Figure 6B:
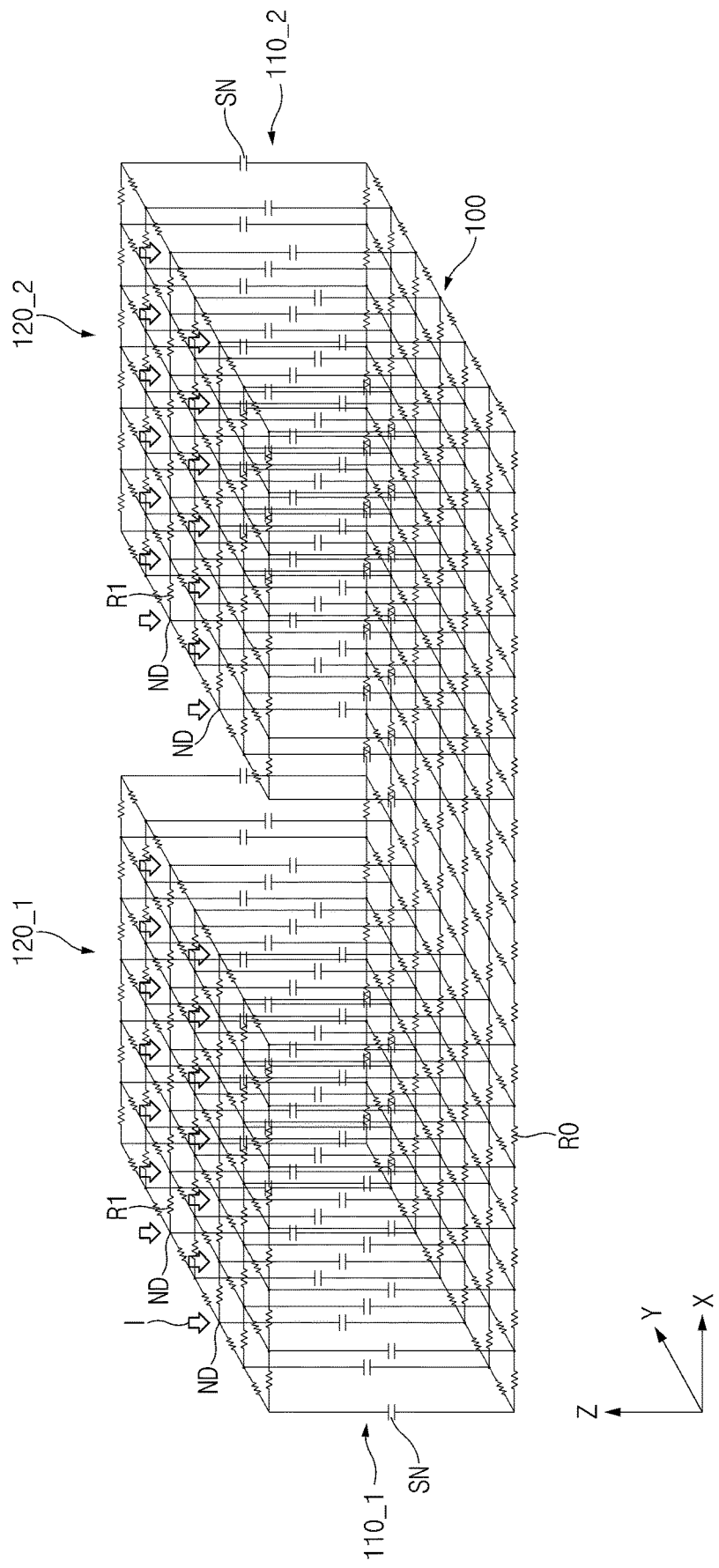

FIG. 6A is a schematic plan view illustrating a capacitor, and FIG. 6B is a schematic diagram illustrating a distributed model circuit corresponding to the capacitor, according to an embodiment of the disclosure.

Referring to FIGS. 6A and 6B, the capacitor may include line layers 130_5 and 130_6 and line layers 130_7 and 130_8. Additional regions AR1 and AR2 may be located on opposite sides of, and adjacent to, center region (CR) with respect to the Y-direction, and additional regions AR1 and AR2 may extend in the X-direction to be coextensive with center region (CR). The line layers 130_5 and 130_6 may extend in the Y-direction in additional region AR1 of the upper electrode layers 120_1 and 120_2, and the line layers 130_7 and 130_8 may extend in the Y-direction in additional region AR2 of the upper electrode layers 120_1 and 120_2.

That is, the line layers 130_5 and 130_6 may be formed in additional region AR1 of the center region (CR) with respect to the Y-axis direction. The line layers 130_7 and 130_8 may be formed in the additional region AR2 of the center region (CR) with respect to the Y-axis direction.

Each of the line layers 130_5 to 130_8 may be formed in a line shape extending in the X-axis direction. The line layers 130_5 to 130_8 may be formed, respectively in additional region AR1 and additional region AR2, to traverse the upper electrode layers 120_1 and 120_2 in the X-axis direction.

The line layer 130_5 and the line layer 130_6 may be spaced apart from each other by a predetermined distance in the Y-axis direction. The line layer 130_7 and the line layer 130_8 may be spaced apart from each other by a predetermined distance in the Y-axis direction. The line layers 130_5 and 130_6 may be spaced apart from the line layers 130_7 and 130_8 by a predetermined distance in the Y-axis direction. The line layers 130_5 and 130_7 may be spaced apart from each other by a predetermined distance in the Y-axis direction, and the line layers 130_6 and 130_8 may be spaced apart from each other by a predetermined distance in the Y-axis direction. The line layers 130_5 to 130_8 may extend in parallel to each other in the X-axis direction.

In an embodiment, each of the line layers 130_5 and 130_7 may be a line for providing a power-supply voltage. In other embodiments, each of the line layers 130_5 and 130_7 may be a line for providing a ground voltage. The voltage provided through the line layers 130_5 and 130_7 may be transferred to the lower electrode layer 100 through contacts 140_5 and 140_7, the upper electrode layer 120_1, and the storage nodes (SN).

In an embodiment, each of the line layers 130_6 and 130_8 may be a line for providing a ground voltage. In other embodiments, each of the line layers 130_6 and 130_8 may be a line for providing a power-supply voltage. The voltage provided through the line layers 130_6 and 130_8 may be transferred to the lower electrode layer 100 through contacts 140_6 and 140_8, the upper electrode layer 120_2, and the storage nodes (SN).

The contacts 140_5 and 140_7 (e.g., each contact denoted as a "via") may be formed between the upper electrode layer 120_1 and the line layers 130_5 and 130_7 respectively, and the contacts 140_6 and 140_8 (e.g., each contact denoted as a "via") may be formed between the upper electrode layer 120_2 and the line layers 130_6 and 130_8, respectively. That is, the contact 140_5 may be formed between the upper electrode layer 120_1 and the line layer 130_5. The contact 140_6 may be formed between the upper electrode layer 120_2 and the line layer 130_6. The contact 140_7 may be formed between the upper electrode layer 120_1 and the line layer 130_7. The contact 140_8 may be formed between the upper electrode layer 120_2 and the line layer 130_8.

The contact 140_5 may electrically interconnect the upper electrode layer 120_1 and the line layer 130_5. The contact 140_6 may electrically interconnect the upper electrode layer 120_2 and the line layer 130_6. The contact 140_7 may electrically interconnect the upper electrode layer 120_1 and the line layer 130_7. The contact 140_8 may electrically interconnect the upper electrode layer 120_2 and the line layer 130_8.

The capacitor shown in FIG. 6A may be represented by the distributed model circuit shown in FIG. 6B. In an embodiment illustrated by FIG. 6B, the nodes (ND) receiving the current (I) may be disposed at both sides of the center region (CR) of the upper electrode layers 120_1 and 120_2 with respect to the Y-axis direction. The nodes (ND) receiving the current (I) may be arranged in two lines, or parallel rows, that extend in the X-axis direction.

Figure 7A:
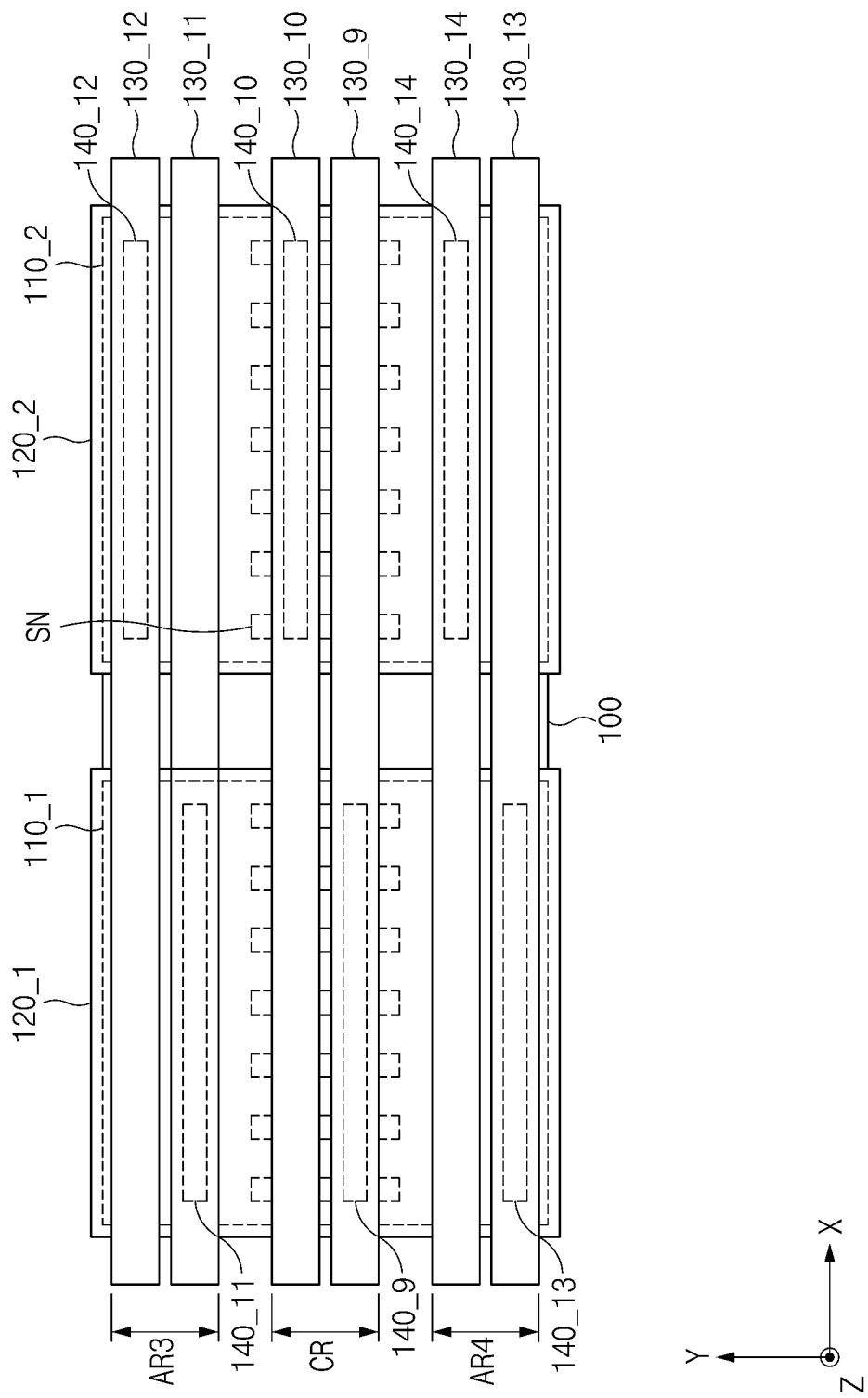
Figure 7B:
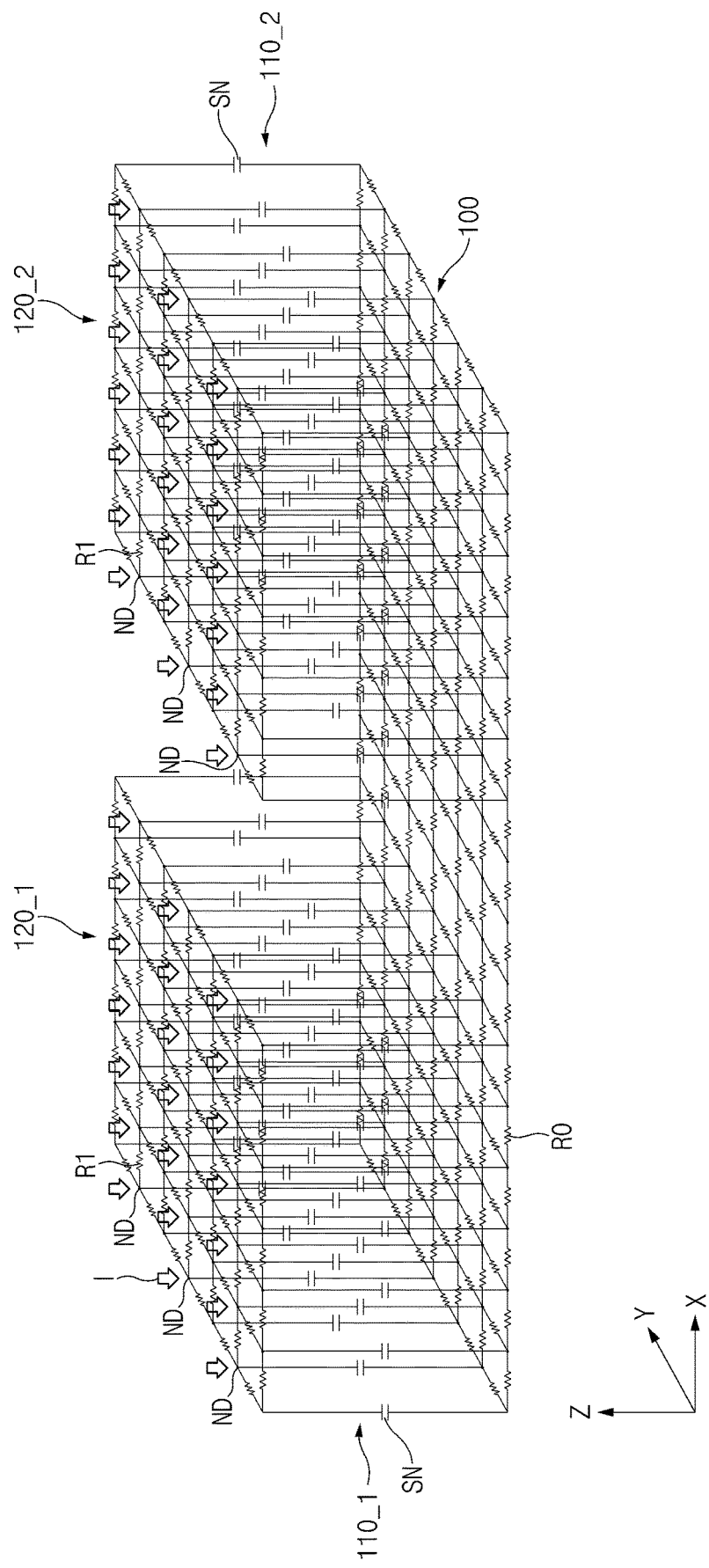

FIG. 7A is a schematic plan view illustrating a capacitor, and FIG. 7B is a schematic diagram illustrating a distributed model circuit corresponding to the capacitor, according to an embodiment of the disclosure.

Referring to FIGS. 7A and 7B, the capacitor may include line layers 130_9 and 130_10, line layers 130_11 and 130_12, and line layers 130_13 and 130_14. Additional regions AR3 and AR4 may be located on opposite sides of, and spaced apart from, center region (CR) with respect to the Y-direction. Additional regions AR3 and AR4 may extend in the X-direction to be coextensive with center region (CR). The line layers 130_9 and 130_10 may be formed in the center region (CR) of the upper electrode layers 120_1 and 120_2. The pair of line layers 130_11 and 130_12 and the pair of line layers 130_13 and 130_14 may be respectively formed in additional regions AR3 and AR4 of the upper electrode layers 120_1 and 120_2. In more detail, the line layers 130_11 and 130_12 may be formed in additional region AR3, and the line layers 130_13 and 130_14 may be formed in the additional region AR4.

Each of the line layers 130_9 to 130_14 may be formed in a line shape extending in the X-axis direction. The line layers 130_9 to 130_14 may be formed, respectively in the center region (CR), additional region AR3 and additional region AR4, to traverse the upper electrode layers 120_1 and 120_2 in the X-axis direction.

The line layer 130_9 and the line layer 130_10 are adjacent to each other and may be spaced apart from each other by a predetermined distance in the Y-axis direction. The line layer 130_11 and the line layer 130_12 are adjacent to each other and may be spaced apart from each other by a predetermined distance in the Y-axis direction. The line layer 130_13 and the line layer 130_14 are adjacent to each other and may be spaced apart from each other by a predetermined distance in the Y-axis direction. The line layers 130_9 to 130_14 may extend in parallel to each other in the X-axis direction.

In an embodiment, each of the line layers 130_9, 130_11, and 130_13 may be a line for providing a power-supply voltage. In other embodiments, each of the line layers 130_9, 130_11, and 130_13 may be a line for providing a ground voltage. The voltage provided through the line layers 130_9, 130_11, and 130_13 may be transferred to the lower electrode layer 100 through respective contacts 140_9, 140_11, and 140_13, the upper electrode layer 120_1, and the storage nodes (SN).

In an embodiment, each of the line layers 130_10, 130_12, and 130_14 may be a line for providing a ground voltage. In other embodiments, each of the line layers 130_10, 130_12, and 130_14 may be a line for providing a power-supply voltage. The voltage provided through the line layers 130_10, 130_12, and 130_14 may be transferred to the lower electrode layer 100 through respective contacts 140_10, 140_12, and 140_14, the upper electrode layer 120_2, and the storage nodes (SN).

The contacts 140_9, 140_11, and 140_13 (e.g., each contact denoted as a "via") may be formed between the upper electrode layer 120_1 and the line layers 130_9, 130_11, and 130_13, respectively, and the contacts 140_10, 140_12, and 140_14 (e.g., each contact denoted as a "via") may be formed between the upper electrode layer 120_2 and the line layers 130_10, 130_12, and 130_14, respectively. That is, the contact 140_9 may be formed between the upper electrode layer 120_1 and the line layer 130_9. The contact 140_10 may be formed between the upper electrode layer 120_2 and the line layer 130_10. The contact 140_11 may be formed between the upper electrode layer 120_1 and the line layer 130_11. The contact 140_12 may be formed between the upper electrode layer 120_2 and the line layer 130_12. The contact 140_13 may be formed between the upper electrode layer 120_1 and the line layer 130_13. The contact 140_14 may be formed between the upper electrode layer 120_2 and the line layer 130_14.

The contact 140_9 may electrically interconnect the upper electrode layer 120_1 and the line layer 130_9. The contact 140_10 may electrically interconnect the upper electrode layer 120_2 and the line layer 130_10. The contact 140_11 may electrically interconnect the upper electrode layer 120_1 and the line layer 130_11. The contact 140_12 may electrically interconnect the upper electrode layer 120_2 and the line layer 130_12. The contact 140_13 may electrically interconnect the upper electrode layer 120_1 and the line layer 130_13. The contact 140_14 may electrically interconnect the upper electrode layer 120_2 and the line layer 130_14.

The capacitor shown in FIG. 7A may be represented by the distributed model circuit shown in FIG. 7B. In an embodiment illustrated by FIG. 7B, the nodes (ND) receiving the current (I) may be disposed at the center region (CR) of the upper electrode layers 120_1 and 120_2 with respect to the Y-axis direction, and may be disposed on both sides of the center region (CR), in additional regions AR3 and AR4 of the upper electrode layers 120_1 and 120_2, with respect to the Y-axis direction. Thus, the nodes (ND) receiving the current (I) may be arranged in three lines or rows that are substantially parallel in the X-axis direction.

Figure 8A:
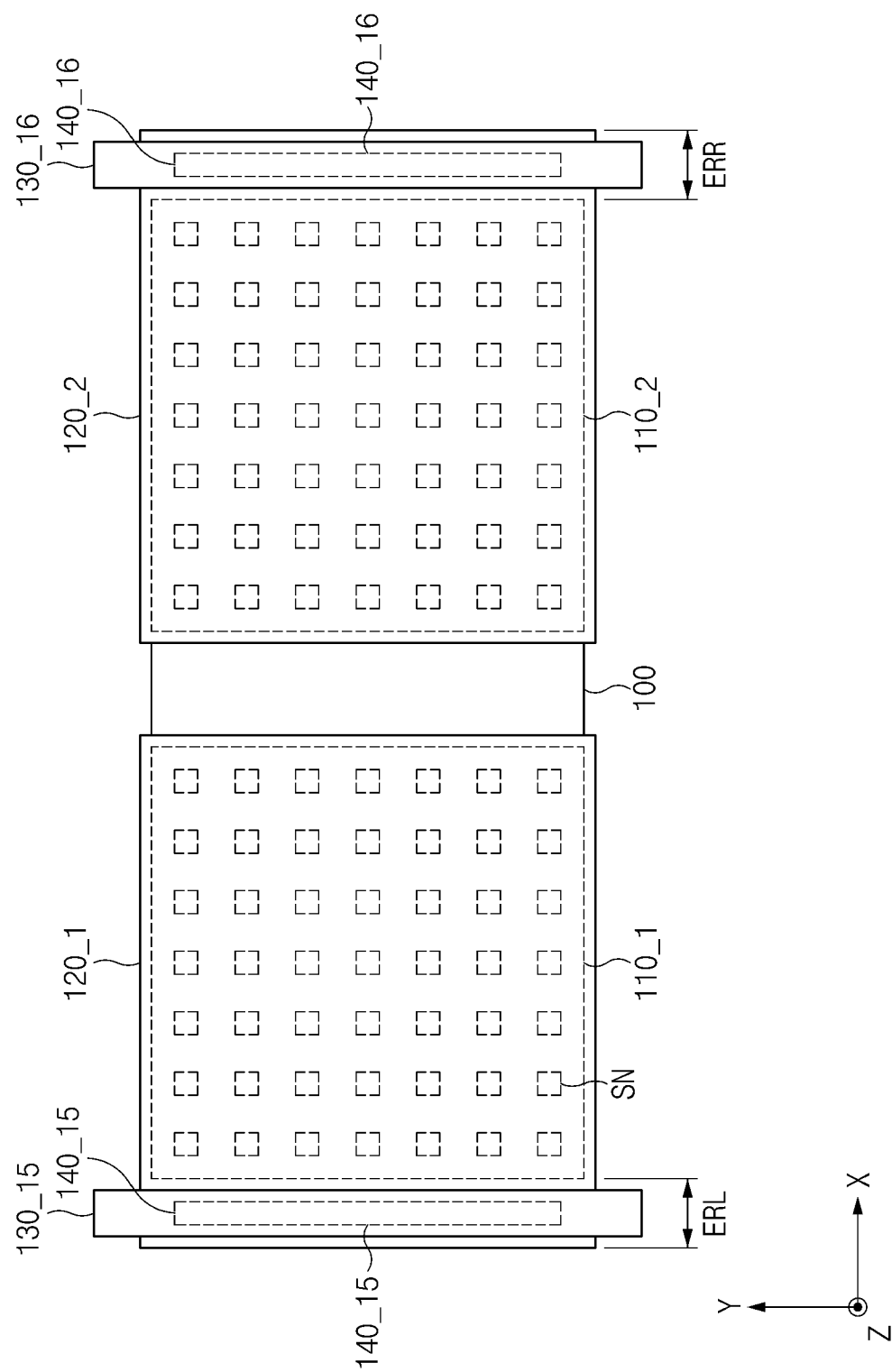
Figure 8B:
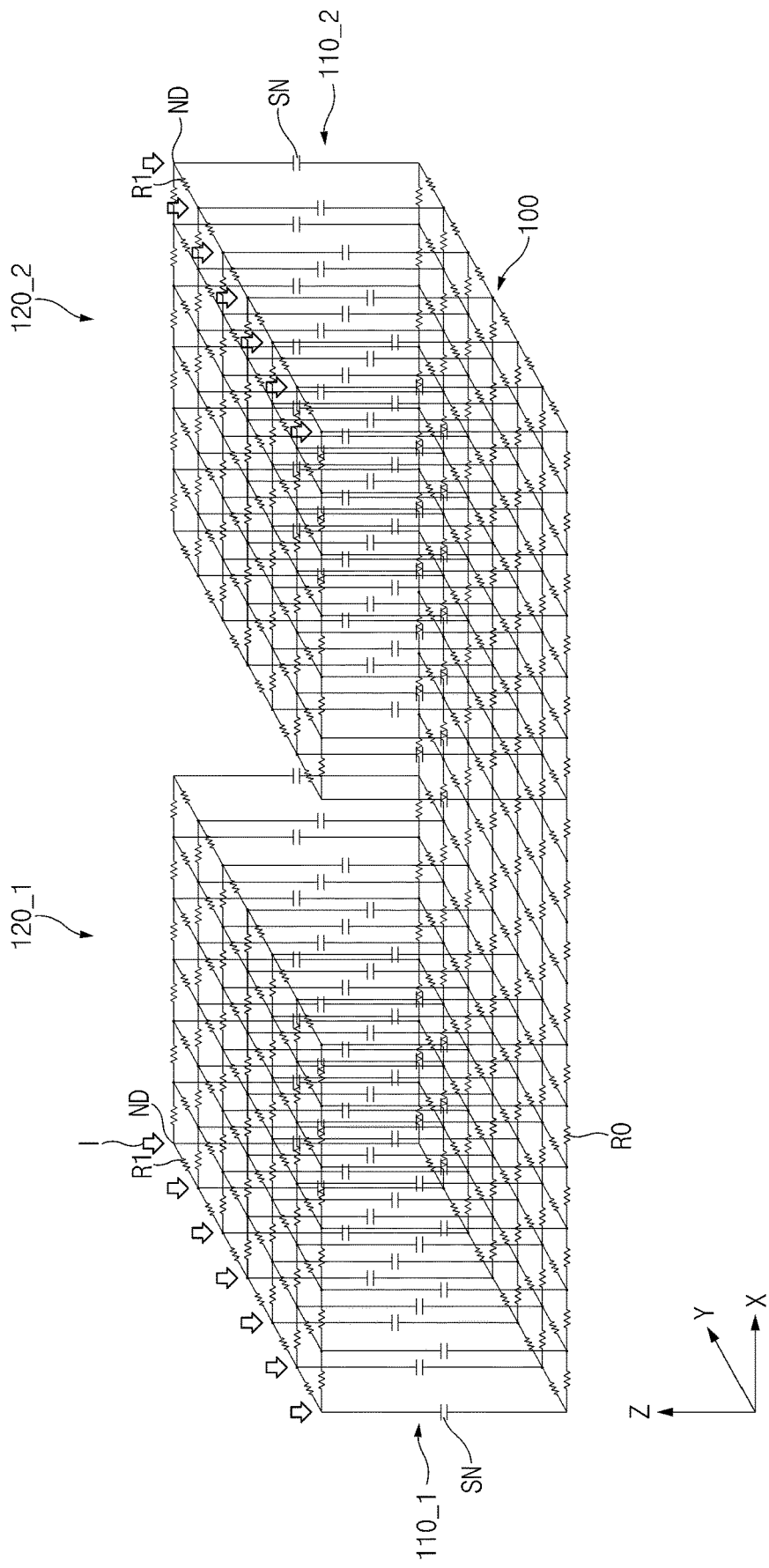

FIG. 8A is a schematic plan view illustrating a capacitor, and FIG. 8B is a schematic diagram illustrating a distributed model circuit corresponding to the capacitor, according to an embodiment of the disclosure Referring to FIGS. 8A and 8B, the upper electrode layers 120_1 and 120_2 may respectively include edge regions ERL and ERR extending in opposite X-axis directions. In more detail, the upper electrode layer 120_1 may include the edge region ERL extending in a first X-axis direction, and the upper electrode layer 120_2 may include the edge region ERR extending in a second, opposite X-axis direction. In an embodiment, the edge regions ERL and ERR may not overlap with the lower electrode layer 100 in the Z-axis direction. In other embodiments, the edge regions ERL and ERR may overlap, partly or entirely, with the lower electrode layer 100 in the Z-axis direction (i.e., overlap in a plan view).

A line layer 130_15 may be formed in the edge region ERL of the upper electrode layer 120_1, and a line layer 130_16 may be formed in the edge region ERR of the upper electrode layer 120_2. In other words, some parts or portions of the line layer 130_15 may overlap with the edge region ERL, which is formed at one side, in the X-axis direction, of the upper electrode layer 120_1. Some parts or portions of the line layer 130_16 may overlap with the edge region ERR in the Z-axis direction, which is formed at the other side, in the X-axis direction, of the upper electrode layer 120_2.

Each of the line layers 130_15 and 130_16 may be formed in a line shape extending in the Y-axis direction. The line layers 130_15 and 130_16 may be formed to traverse respective edge regions ERL and ERR of the upper electrode layers 120_1 and 120_2 in the Y-axis direction.

The line layer 130_15 and the line layer 130_16 may be spaced apart from each other by a predetermined distance in the X-axis direction. The line layer 130_15 and the line layer 130_16 may extend in parallel to each other in the Y-axis direction.

In an embodiment, the line layer 130_15 may be a line for providing a power-supply voltage. In other embodiments, the line layer 130_15 may be a line for providing a ground voltage. The voltage provided through the line layer 130_15 may be transferred to the lower electrode layer 100 through a contact 140_15, the upper electrode layer 120_1, and the storage nodes (SN).

In addition, in an embodiment, the line layer 130_16 may be a line for providing the ground voltage. In other embodiments, the line layer 130_16 may be a line for providing the power-supply voltage. The voltage provided through the line layer 130_16 may be transferred to the lower electrode layer 100 through a contact 140_16, the upper electrode layer 120_2, and the storage nodes (SN).

The contact 140_15 (for example, a "via") may be formed between the edge region ERL of the upper electrode layer 120_1 and the line layer 130_15. Similarly, and the contact 140_16 (for example, also a "via") may be formed between the edge region ERR of the upper electrode layer 120_2 and the line layer 130_16. That is, the contact 140_15 may be a via formed between the upper electrode layer 120_1 and the line layer 130_15. The contact 140_16 may be a via formed between the upper electrode layer 120_2 and the line layer 130_16. The contact 140_15 may be formed between, and electrically interconnect, the upper electrode layer 120_1 and the line layer 130_15. The contact 140_16 may be formed between, and electrically interconnect, the upper electrode layer 120_2 and the line layer 130_16.

The capacitor shown in FIG. 8A may be represented by the distributed model circuit shown in FIG. 8B. In an embodiment illustrated by FIG. 8B, the nodes (ND) receiving the current (I) may be disposed at both edge regions ERL and ERR of the upper electrode layers 120_1 and 120_2 with respect to the X-axis direction. The nodes (ND) receiving the current (I) may be arranged in two lines or rows that are substantially parallel in the Y-axis direction.

Figure 9A:
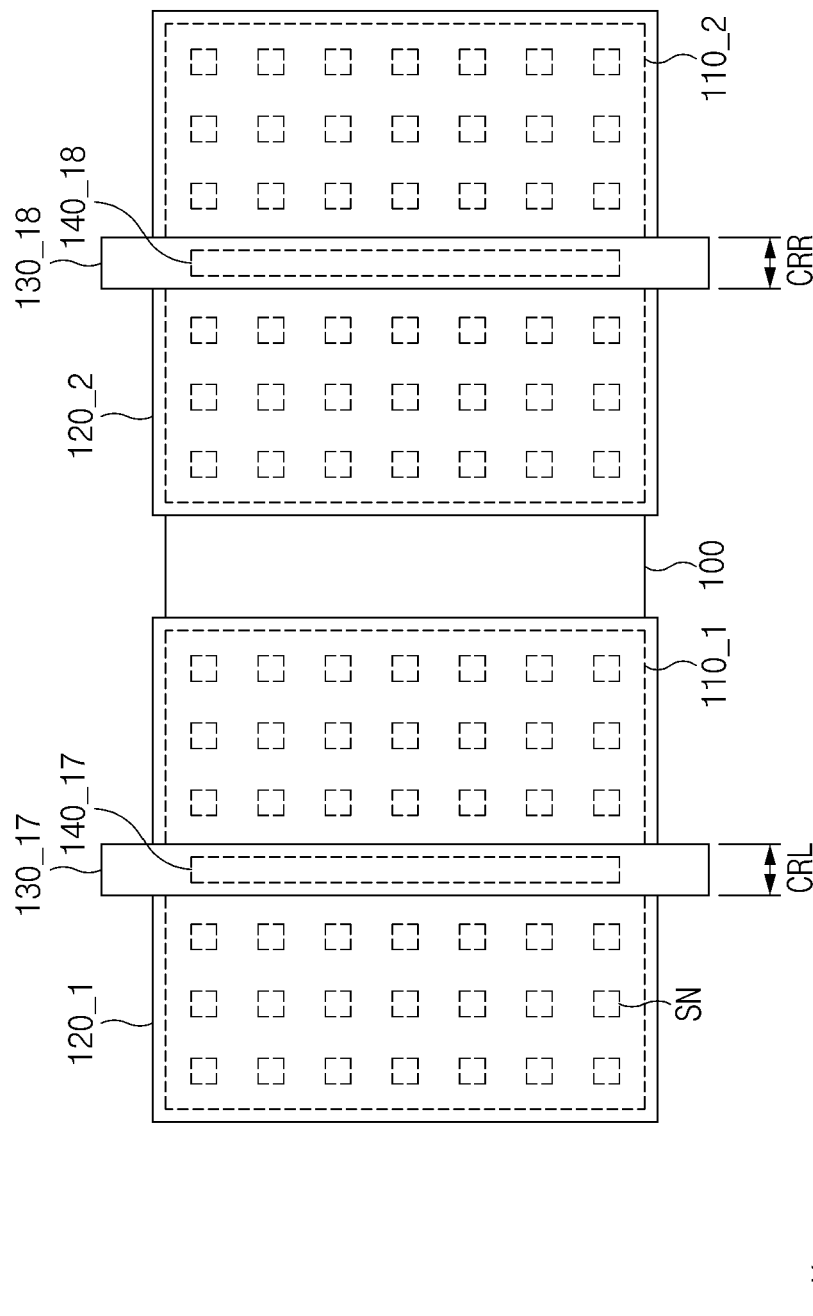
Figure 9B:
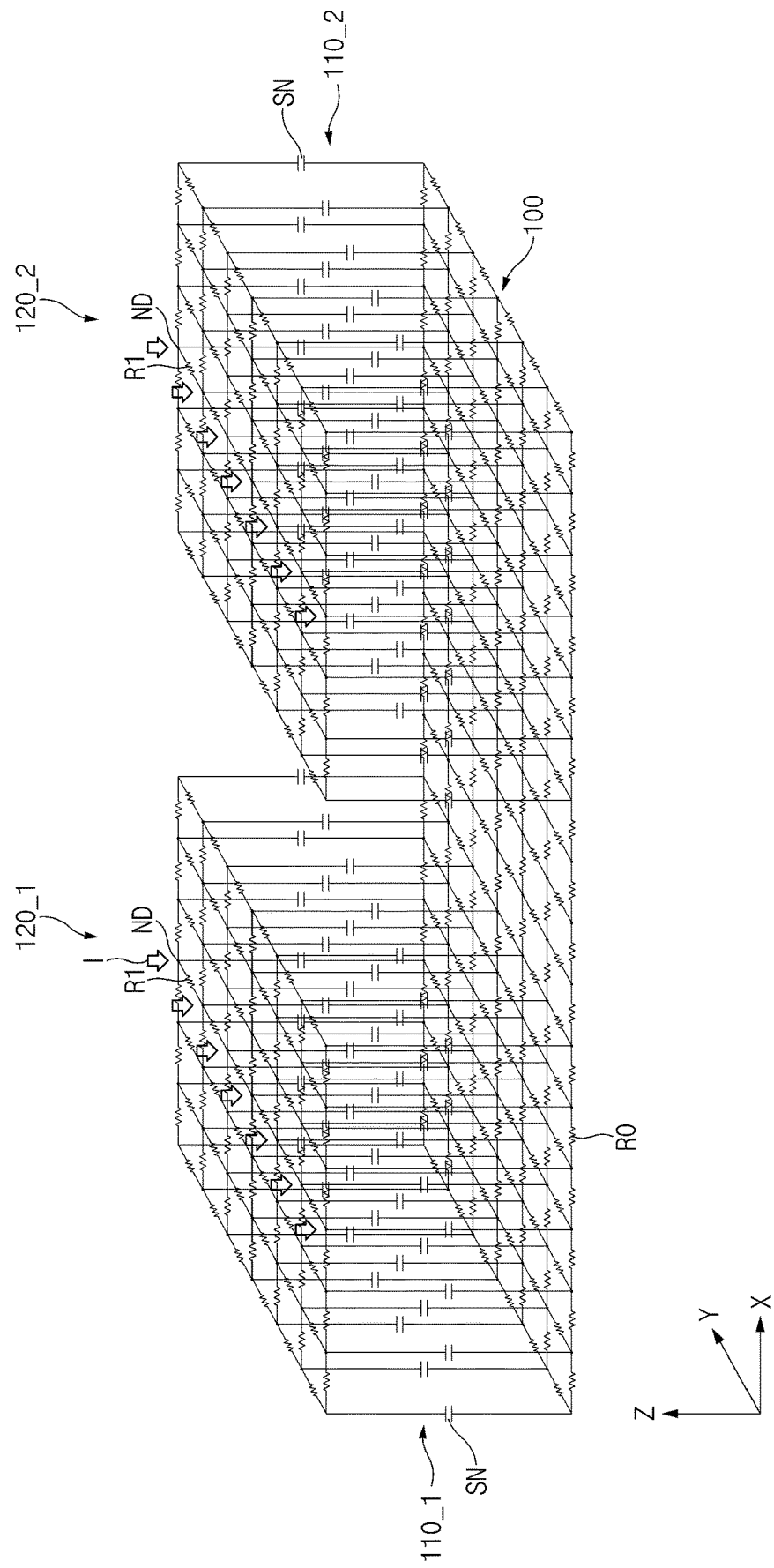

FIG. 9A is a schematic plan view illustrating a capacitor, and FIG. 9B is a schematic diagram illustrating a distributed model circuit corresponding to the capacitor, according to an embodiment of the disclosure.

Referring to FIGS. 9A and 9B, a line layer 130_17 may be formed in the center region CRL of the upper electrode layer 120_1, and a line layer 130_18 may be formed in the center region CRR of the upper electrode layer 120_2. That is, some parts or portions of the line layer 130_17 may overlap with the center region CRL of the upper electrode layer 120_1 in the Z-axis direction, and some parts or portions of the line layer 130_18 may overlap with the center region CRR of the upper electrode layer 120_2 in the Z-axis direction. Each of the line layers 130_17 and 130_18 may be formed in a line shape extending in the Y-axis direction. The line layer 130_17 may be formed to traverse the center region CRL in the Y-axis direction, and the line layer 130_18 may be formed to traverse the center region CRR in the Y-axis direction.

The line layer 130_17 and the line layer 130_18 may be spaced apart from each other by a predetermined distance in the X-axis direction. The line layer 130_17 and the line layer 130_18 may extend in parallel to each other in the Y-axis direction.

In an embodiment, the line layer 130_17 may be a line for providing a power-supply voltage. In other embodiments, the line layer 130_17 may be a line for providing a ground voltage. The voltage provided through the line layer 130_17 may be transferred to the lower electrode layer 100 through a contact 140_17, the upper electrode layer 120_1, and the storage nodes (SN).

In addition, in an embodiment, the line layer 130_18 may be a line for providing the ground voltage. In other embodiments, the line layer 130_18 may be a line for providing the power-supply voltage. The voltage provided through the line layer 130_18 may be transferred to the lower electrode layer 100 through a contact 140_18, the upper electrode layer 120_2, and the storage nodes (SN).

The contact 140_17 (for example, a "via") may be formed between the center region CRL of the upper electrode layer 120_1 and the line layer 130_17. Similarly, the contact 140_18 (for example, also a "via") may be formed between the center region CRR of the upper electrode layer 120_2 and the line layer 130_18. That is, the contact 140_17 may be a via formed between the upper electrode layer 120_1 and the line layer 130_17. The contact 140_18 may be a via formed between the upper electrode layer 120_2 and the line layer 130_18. The contact 140_17 may be formed between, and electrically interconnect, the upper electrode layer 120_1 and the line layer 130_17. The contact 140_18 may be formed between, and electrically interconnect, the upper electrode layer 120_2 and the line layer 130_18.

The capacitor shown in FIG. 9A may be represented by the distributed model circuit shown in FIG. 9B. In an embodiment illustrated by FIG. 9B, the nodes (ND) receiving the current (I) may be disposed at the center regions CRL and CRR of the upper electrode layers 120_1 and 120_2 with respect to the X-axis direction. The nodes (ND) receiving the current (I) may be arranged in two lines or rows that are substantially parallel in the Y-axis direction.

Figure 10A:
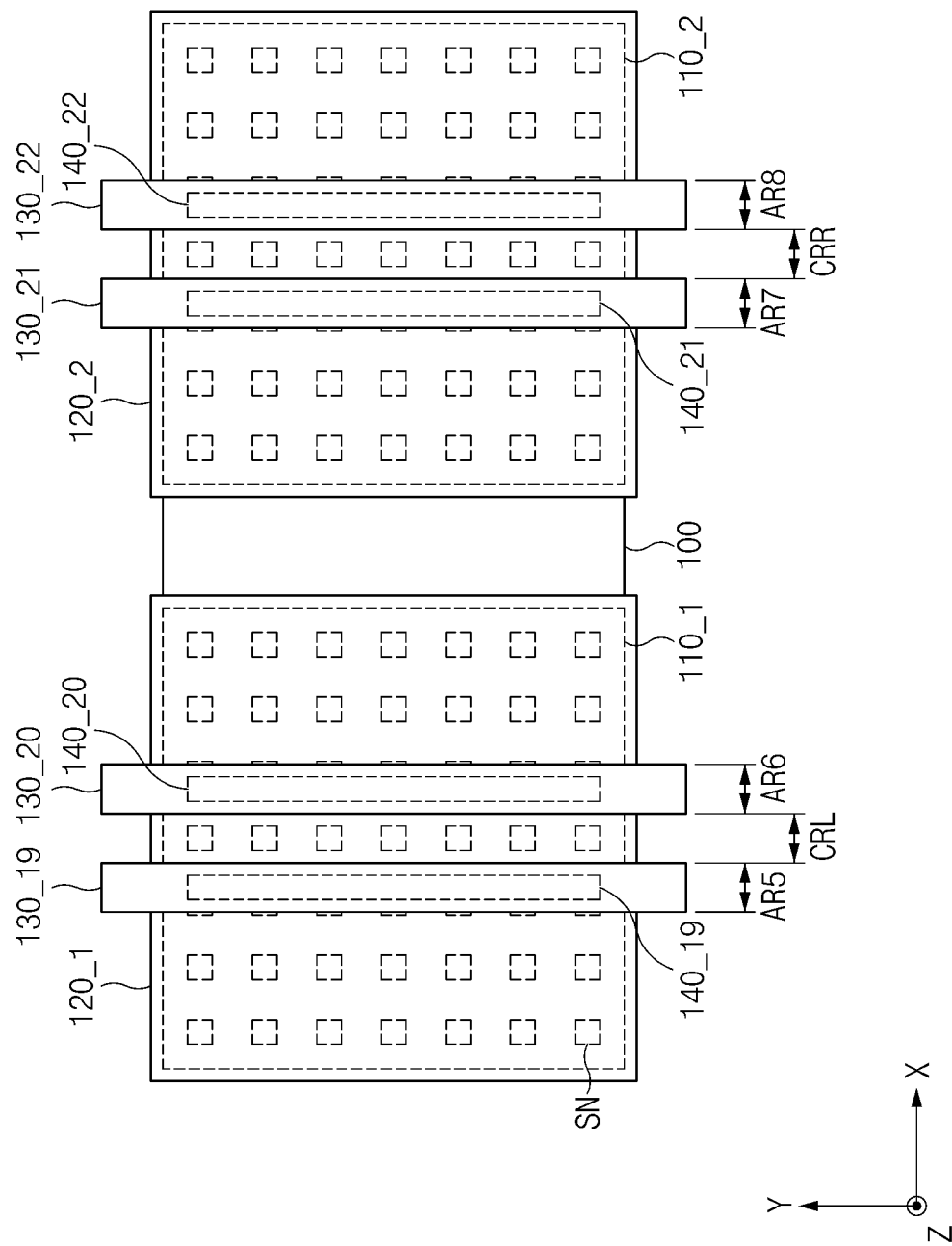
Figure 10B:
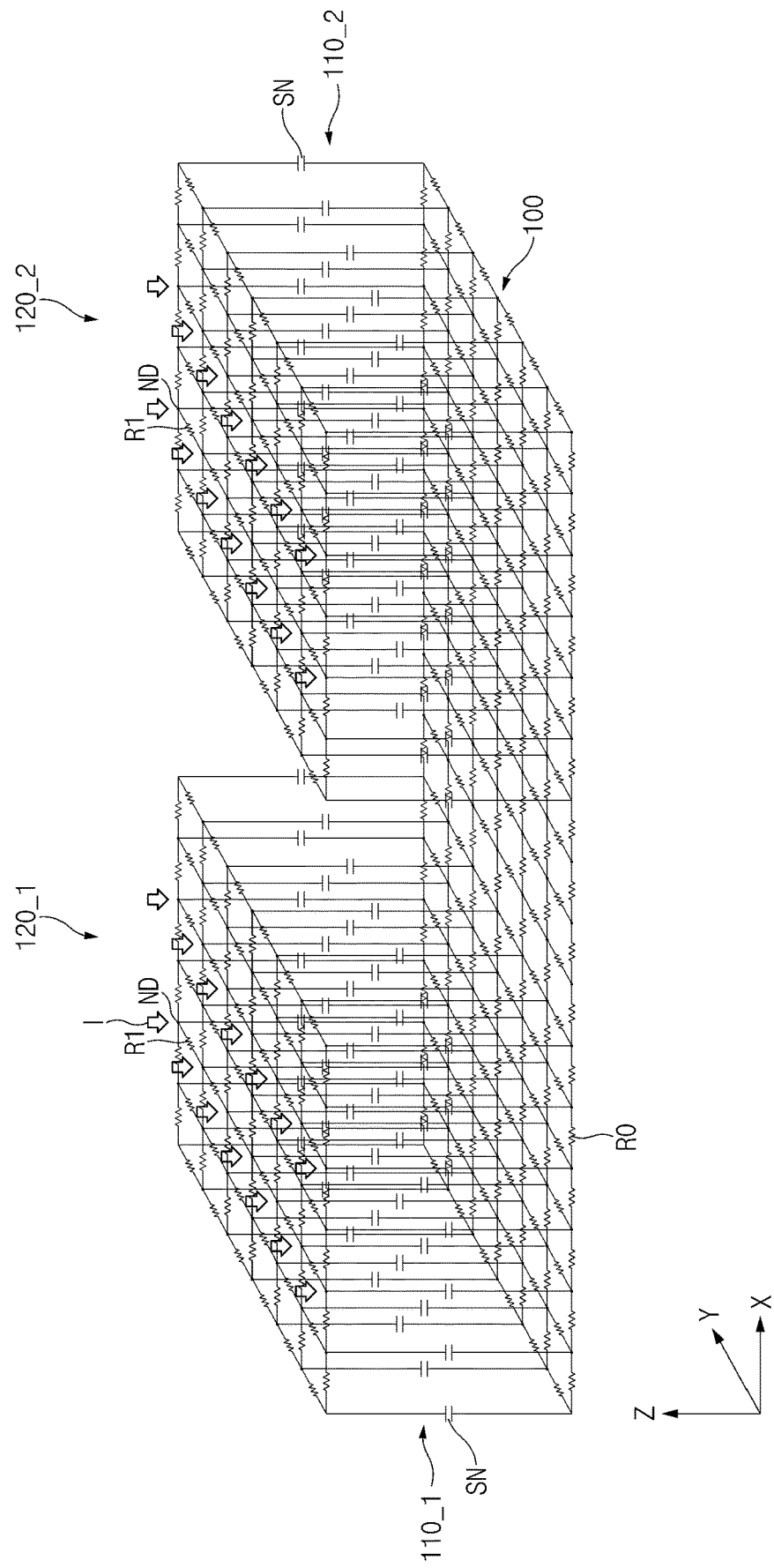

FIG. 10A is a schematic plan view illustrating a capacitor, and FIG. 10B is a schematic diagram illustrating a distributed model circuit corresponding to the capacitor, according to an embodiment of the disclosure.

The capacitor shown in FIGS. 10A and 10B may include line layers 130_19 and 130_20 and line layers 130_21 and 130_22, and center regions CRL and CRR described above with reference to FIG. 9A. Additional regions AR5 and AR6 may be located on opposite sides of, and adjacent to, center region (CRL) with respect to the X-direction. Additional regions AR5 and AR6 may extend in the Y-direction to be coextensive with center region (CRL). Additional regions AR7 and AR8 may be located on opposite sides of, and adjacent to, center region (CRR) with respect to the X-direction. Additional regions AR7 and AR8 may extend in the Y-direction to be coextensive with center region (CRR). In this case, the line layers 130_19 and 130_20 may be formed in additional regions AR5 and AR6, respectively, of the upper electrode layer 120_1 of the center region CRL, and the line layers 130_21 and 130_22 may be formed in additional regions AR7 and AR8, respectively, of the upper electrode layer 120_2 of the center region CRR.

In more detail, the line layer 130_19 may be formed in additional region AR5 adjacent to the center region CRL with respect to the X-axis direction. The line layer 130_20 may be formed in additional region AR6 adjacent to the center region CRL with respect to the opposite X-axis direction. The line layer 130_21 may be formed in additional region AR7 adjacent to the center region CRR with respect to the X-axis direction. The line layer 130_22 may be formed in additional region AR8 adjacent to the center region CRR with respect to the opposite X-axis direction.

Each of the line layers 130_19 to 130_22 may be formed in a line shape extending in the Y-axis direction. The line layers 130_19 and 130_20 may be formed to traverse the upper electrode layer 120_1 in the Y-axis direction. The line layers 130_21 and 130_22 may be formed to traverse the upper electrode layer 120_2 in the Y-axis direction.

The line layer 130_19 and the line layer 130_20 may be spaced apart from each other by a predetermined distance in the X-axis direction. The line layer 130_21 and the line layer 130_22 may be spaced apart from each other by a predetermined distance in the X-axis direction. The line layers 130_19 and 130_20 and the line layers 130_21 and 130_22 may be spaced apart from each other by a predetermined distance in the X-axis direction. The line layer 130_19 and the line layer 130_21 may be spaced apart from each other by a predetermined distance in the X-axis direction, and line layer 130_20 and the line layer 130_22 may be spaced apart from each other by a predetermined distance in the X-axis direction. The line layers 130_19 to 130_22 may extend in parallel or substantially parallel to each other in the Y-axis direction.

In an embodiment, each of the line layers 130_19 and 130_20 may be a line for providing a power-supply voltage. In other embodiments, each of the line layers 130_19 and 130_20 may be a line for providing a ground voltage. The voltage provided through the line layers 130_19 and 130_20 may be transferred to the lower electrode layer 100 through contacts 140_19 and 140_20 respectively, the upper electrode layer 120_1, and the storage nodes (SN).

In an embodiment, each of the line layers 130_21 and 130_22 may be a line for providing a ground voltage. In other embodiments, each of the line layers 130_21 and 130_22 may be a line for providing a power-supply voltage. The voltage provided through the line layers 130_21 and 130_22 may be transferred to the lower electrode layer 100 through contacts 140_21 and 140_22 respectively, the upper electrode layer 120_2, and the storage nodes (SN).

The contacts 140_19 and 140_20 (e.g., each contact denoted as a "via") may be formed between the upper electrode layer 120_1 and the line layers 130_19 and 130_20, and the contacts 140_21 and 140_22 (e.g., each contact denoted as a "via") may be formed between the upper electrode layer 120_2 and the line layers 130_21 and 130_22. That is, the contact 140_19 may be formed between the upper electrode layer 120_1 and the line layer 130_19. The contact 140_20 may be formed between the upper electrode layer 120_1 and the line layer 130_20. The contact 140_21 may be formed between the upper electrode layer 120_2 and the line layer 130_21. The contact 140_22 may be formed between the upper electrode layer 120_2 and the line layer 130_22.

The contact 140_19 may electrically interconnect the upper electrode layer 120_1 and the line layer 130_19. The contact 140_20 may electrically interconnect the upper electrode layer 120_1 and the line layer 130_20. The contact 140_21 may electrically interconnect the upper electrode layer 120_2 and the line layer 130_21. The contact 140_22 may electrically interconnect the upper electrode layer 120_2 and the line layer 130_22.

The capacitor shown in FIG. 10A may be represented by the distributed model circuit shown in FIG. 10B. In an embodiment illustrated by FIG. 10B, the nodes (ND) receiving the current (I) may be disposed at both sides of the center regions CRL and CRR of the upper electrode layers 120_1 and 120_2, respectively, with respect to the X-axis direction. The nodes (ND) receiving the current (I) may be arranged in four lines or rows that are substantially parallel in the Y-axis direction.

Figure 11A:
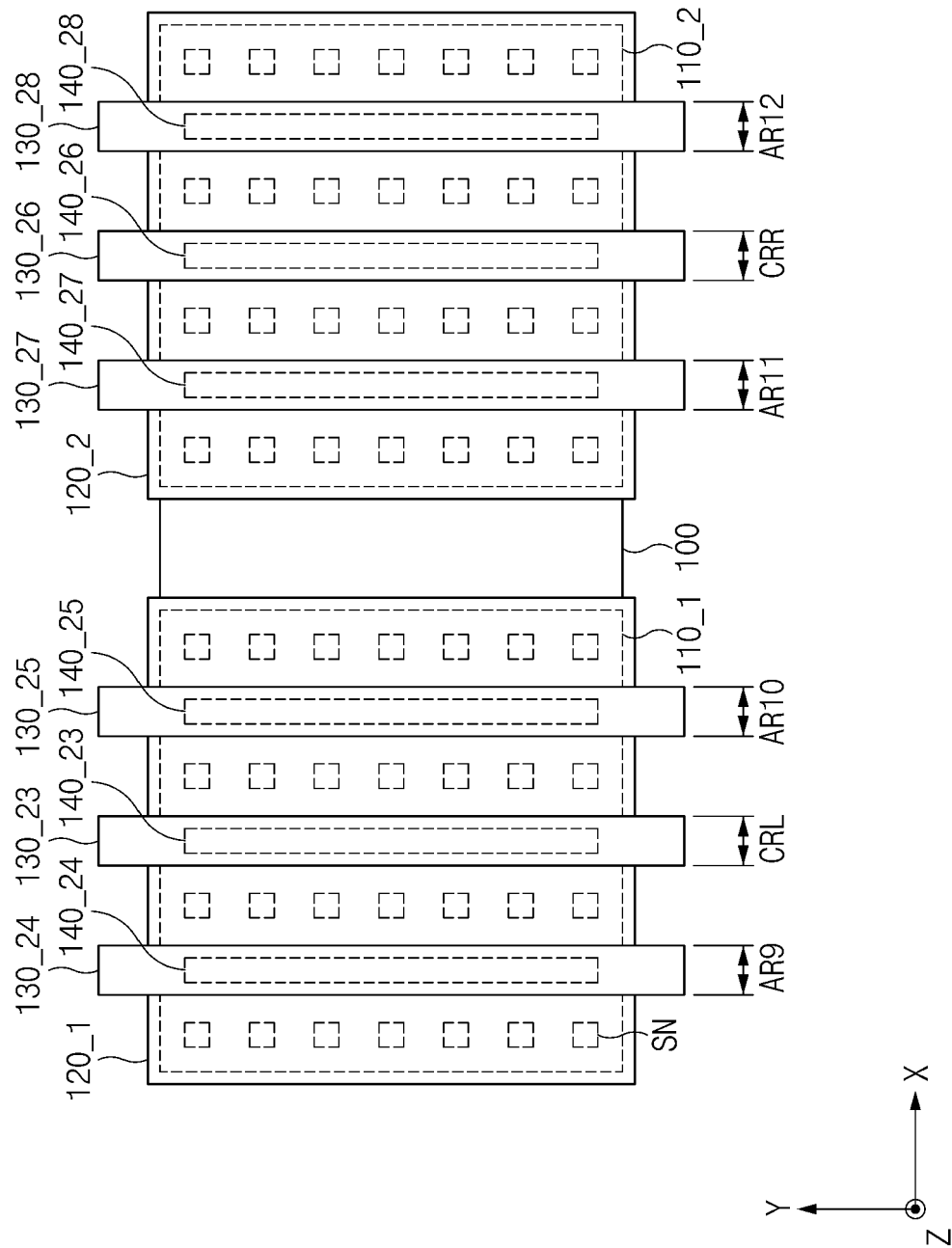
Figure 11B:
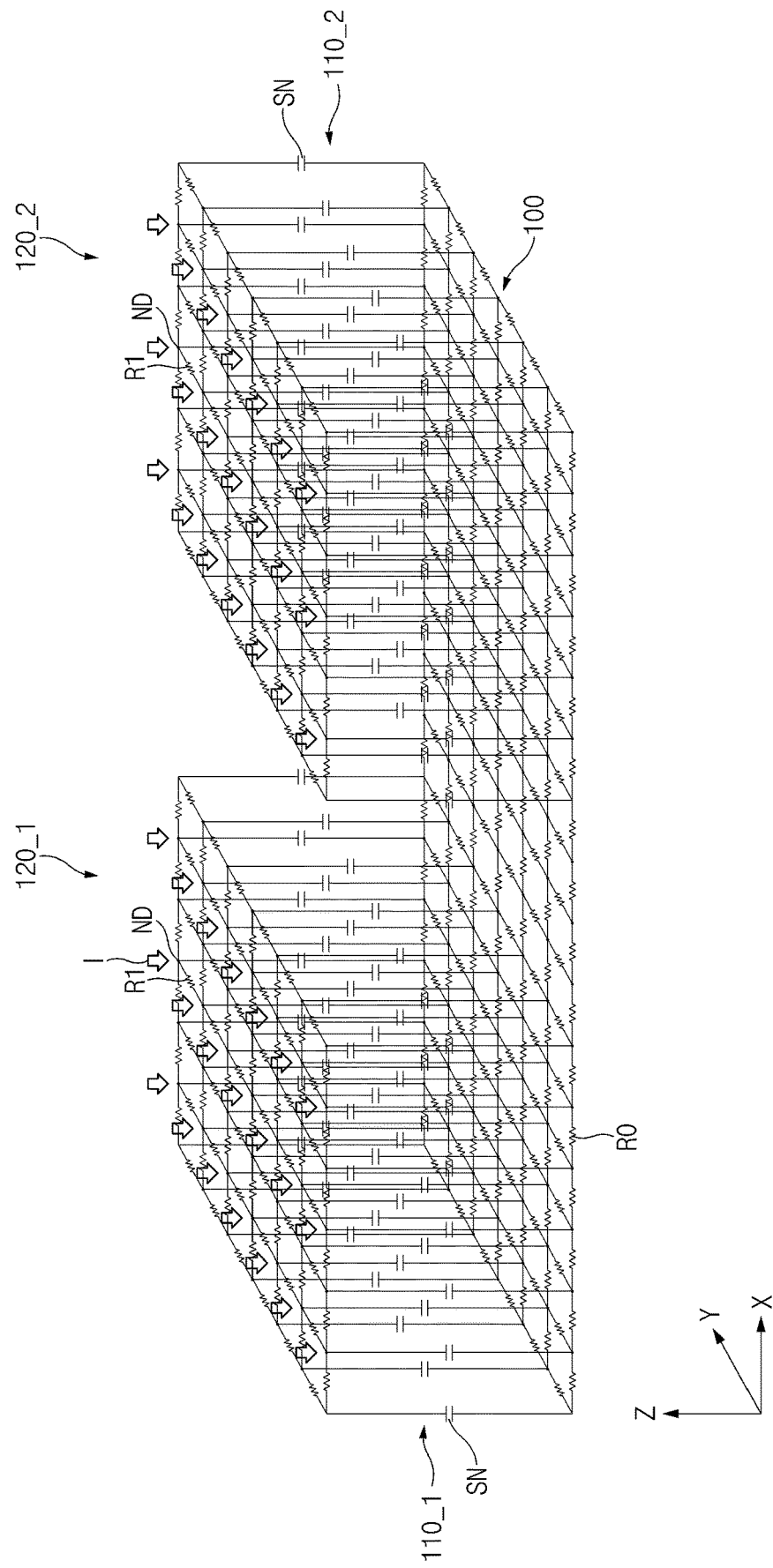

FIG. 11A is a schematic plan view illustrating a capacitor, and FIG. 11B is a schematic diagram illustrating a distributed model circuit corresponding to the capacitor, according to an embodiment of the disclosure.

Referring to FIGS. 11A and 11B, a capacitor may include line layers 130_23 to 130_25 and line layers 130_26 to 130_28, as well as center regions CRL and CRR described above with reference to FIG. 9A. Additional regions AR9 and AR10 may be located on opposite sides of, and spaced apart from, center region (CRL) with respect to the X-direction. Additional regions AR9 and AR10 may extend in the Y-direction to be coextensive with center region (CRL). Additional regions AR11 and AR12 may be located on opposite sides of, and adjacent to, center region (CRR) with respect to the X-direction. Additional regions AR11 and AR12 may extend in the Y-direction to be coextensive with center region (CRL).

In this case, the line layer 130_23 may be formed in the center region CRL of the upper electrode layer 120_1. The line layers 130_24 and 130_25 may be respectively formed in additional regions AR9 and AR10 on opposite sides of the center region CRL. That is, the line layer 130_24 may be formed in additional region AR9 spaced apart from the center region CRL with respect to the X-axis direction, and the line layer 130_25 may be formed in additional region AR10 spaced apart from the center region CRL with respect to the X-axis direction.

The line layer 130_26 may be formed in the center region CRR of the upper electrode layer 120_2. The line layers 130_27 and 130_28 may be respectively formed in additional regions AR11 and AR12 of the center region CRR. That is, the line layer 130_27 may be formed in additional region AR11 spaced apart from the center region CRR with respect to the X-axis direction, and the line layer 130_28 may be formed in additional region AR12 spaced apart from the center region CRR with respect to the X-axis direction.

Each of the line layers 130_23 to 130_28 may be formed in a line shape extending in the Y-axis direction. The line layers 130_23 to 130_25 may be formed to traverse the upper electrode layer 120_1 in the Y-axis direction, and the line layers 130_26 to 130_28 may be formed to traverse the upper electrode layer 120_2 in the Y-axis direction The line layers 130_23 to 130_25 may be spaced apart from each other by a predetermined distance in the X-axis direction. The line layers 130_26 to 130_28 may be spaced apart from each other by a predetermined distance in the X-axis direction. The line layers 130_23 to 130_25 and the line layers 130_26 to 130_28 may be spaced apart, respectively, from each other by a predetermined distance in the X-axis direction. The line layers 130_23 to 130_28 may each be formed to extend in the Y-axis direction.

In an embodiment, each of the line layers 130_23 to 130_25 may be a line for providing a power-supply voltage. In other embodiments, each of the line layers 130_23 to 130_25 may be a line for providing a ground voltage. The voltage provided through the line layers 130_23 to 130_25 may be transferred to the lower electrode layer 100 through contacts 140_23 to 140_25, the upper electrode layer 120_1, and the storage nodes (SN).

In an embodiment, each of the line layers 130_26 to 130_28 may be a line for providing a ground voltage. In other embodiments, each of the line layers 130_26 to 130_28 may be a line for providing a power-supply voltage. The voltage provided through the line layers 130_26 to 130_28 may be transferred to the lower electrode layer 100 through contacts 140_26 to 140_28, the upper electrode layer 120_2, and the storage nodes (SN).

The contacts 140_23, 140_24, and 140_25 (e.g., each contact denoted as a "via") may be formed between the upper electrode layer 120_1 and the line layers 130_23, 130_24, and 130_25, and the contacts 140_26, 140_27, and 140_28 (e.g., each contact denoted as a "via") may be formed between the upper electrode layer 120_2 and the line layers 130_26, 130_27, and 130_28. That is, the contact 140_23 may be formed between the upper electrode layer 120_1 and the line layer 130_23. The contact 140_24 may be formed between the upper electrode layer 120_1 and the line layer 130_24. The contact 140_25 may be formed between the upper electrode layer 120_1 and the line layer 130_25. The contact 140_26 may be formed between the upper electrode layer 120_2 and the line layer 130_26. The contact 140_27 may be formed between the upper electrode layer 120_2 and the line layer 130_27. The contact 140_28 may be formed between the upper electrode layer 120_2 and the line layer 130_28.

The contact 140_23 may electrically interconnect the upper electrode layer 120_1 and the line layer 130_23. The contact 140_24 may electrically interconnect the upper electrode layer 120_1 and the line layer 130_24. The contact 140_25 may electrically interconnect the upper electrode layer 120_1 and the line layer 130_25. The contact 140_26 may electrically interconnect the upper electrode layer 120_2 and the line layer 130_26. The contact 140_27 may electrically interconnect the upper electrode layer 120_2 and the line layer 130_27. The contact 140_28 may electrically interconnect the upper electrode layer 120_2 and the line layer 130_28.

The capacitor shown in FIG. 11A may be represented by the distributed model circuit shown in FIG. 11B. In an embodiment illustrated FIG. 11B, the nodes (ND) receiving the current (I) may be disposed at the center regions CRL and CRR of the upper electrode layers 120_1 and 120_2, respectively, and may also be disposed at both sides of the center regions CRL and CRR of the upper electrode layers 120_1 and 120_2, respectively, with respect to the X-axis direction. The nodes (ND) receiving the current (I) may be arranged in six lines or rows that are substantially parallel in the Y-axis direction.

As is apparent from the above description, capacitors of semiconductor devices and distributed model circuits for the same based on some implementations of the disclosed technology can reflect a resistance change caused by the routing pattern of the capacitor in Equivalent Series Resistance (ESR), thereby reducing the number of errors or an error range in a process for analyzing a circuit simulation and a Power Distribution Network (PDN).

Those skilled in the art will appreciate that the embodiments may be carried out in other specific ways than those set forth herein without departing from the spirit and essential characteristics of the disclosure. The above embodiments are therefore to be construed in all aspects as illustrative and not restrictive. The scope of the disclosure should be determined by the appended claims and their legal equivalents, not by the above description. Further, all changes coming within the meaning and equivalency range of the appended claims are intended to be embraced therein. In addition, those skilled in the art will understand that claims that are not explicitly cited in each other in the appended claims may be presented in combination as an embodiment or included as a new claim by a subsequent amendment after the application is filed.

Although a number of illustrative embodiments have been described, it should be understood that numerous other modifications and embodiments can be devised by those skilled in the art that will fall within the spirit and scope of the principles of this disclosure. Particularly, numerous variations and modifications are possible in the component parts and/or arrangements which are within the scope of the disclosure, the drawings and the accompanying claims. In addition to variations and modifications in the component parts and/or arrangements, alternative uses will also be apparent to those skilled in the art.

What is claimed is:

1. A distributed model circuit of a capacitor comprising:
   a lower electrode layer modeled as a plurality of first resistors corresponding to a first parasitic capacitance;
   a dielectric layer vertically stacked on the lower electrode layer, and configured to include a plurality of storage nodes;
   an upper electrode layer modeled as a plurality of second resistors corresponding to a second parasitic capacitance, and configured to receive a current for measuring an equivalent series resistance (ESR) through a plurality of nodes by which the plurality of second resistors are coupled to each other;
   at least two line layers spaced apart in a vertical direction from the upper electrode layer and disposed in parallel to traverse the upper electrode layer, each line layer configured to supply a current to a node from among the plurality of nodes, respectively, and to receive a voltage for measuring the ESR from the node, respectively; and
   a plurality of contacts that electrically couples each line layer to the upper electrode layer in the vertical direction, wherein each of the nodes vertically overlaps one of the plurality of contacts and the respective line layer, and wherein a resistance value of each of the first resistors and a resistance value of each of the second resistors are changed according to position information of a routing pattern in relation to the plurality of contacts of each of the at least two line layers disposed over a plurality of nodes in the upper electrode layer, such that the changed resistance values are reflected in the ESR.

2. The distributed model circuit of the capacitor according to claim 1, wherein the dielectric layer includes:
a first-group dielectric layer; and
a second-group dielectric layer spaced apart from the first-group dielectric layer by a predetermined distance.

3. The distributed model circuit of the capacitor according to claim 2, wherein the upper electrode layer includes:
a first-group upper electrode layer stacked on the first-group dielectric layer; and
a second-group upper electrode layer stacked on the second-group dielectric layer.

4. The distributed model circuit of the capacitor according to claim 1, wherein:
a first-directional length of the upper electrode layer is set to a plate length, and a second-directional width of the upper electrode layer is set to a plate width; and
wherein the plate length and the plate width are used as variables of the ESR.

5. The distributed model circuit of the capacitor according to claim 4, wherein:
a value of a voltage applied to each of the nodes, a value of the current applied to each of the nodes, a value of each of the first resistors, a value of each of the second resistors, capacitance of each of the storage nodes, the plate length, and the plate width mathematically correspond to a value of the ESR.

6. The distributed model circuit of the capacitor according to claim 1, wherein the lower electrode layer, the dielectric layer, the upper electrode layer, the plurality of contacts, and the at least two line layers are vertically stacked to form a three-dimensional (3D) structure.

* * * * *